US012217697B2

(12) United States Patent
Guo et al.

(10) Patent No.: US 12,217,697 B2
(45) Date of Patent: Feb. 4, 2025

(54) DISPLAY PANEL AND DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Yonglin Guo, Beijing (CN); Yunsheng Xiao, Beijing (CN); Wenhui Gao, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/023,384

(22) PCT Filed: Jun. 30, 2022

(86) PCT No.: PCT/CN2022/103005
§ 371 (c)(1),
(2) Date: Feb. 27, 2023

(87) PCT Pub. No.: WO2024/000478
PCT Pub. Date: Jan. 4, 2024

(65) Prior Publication Data
US 2024/0274085 A1 Aug. 15, 2024

(51) Int. Cl.
*G09G 3/3266* (2016.01)
*G09G 3/32* (2016.01)

(52) U.S. Cl.
CPC ............. *G09G 3/3266* (2013.01); *G09G 3/32* (2013.01); *G09G 2310/0267* (2013.01); *G09G 2310/0286* (2013.01); *G09G 2320/0233* (2013.01)

(58) Field of Classification Search
CPC ......... G09G 2310/0286; G09G 3/3266; G09G 2310/0264; G09G 3/3225; G09G 3/3208;
(Continued)

(56) References Cited

U.S. PATENT DOCUMENTS 10,332,438 B2 * 6/2019 Woo ..................... G09G 3/2014
2011/0234565 A1 * 9/2011 Morii ................... G09G 3/3677 377/79
(Continued)

FOREIGN PATENT DOCUMENTS

CN 108352151 A 7/2018
CN 108564916 A 9/2018
(Continued)

*Primary Examiner* — Koosha Sharifi-Tafreshi
(74) *Attorney, Agent, or Firm* — Ling Wu; Stephen Yang; Ling and Yang Intellectual Property

(57) ABSTRACT

A display panel and a display apparatus are disclosed. The display panel includes: a display region, including M first display regions sequentially disposed along a first direction, and a non-display region, including M first GOA circuits and M clock signal line groups; a first display region includes multiple first signal lines sequentially disposed along the first direction and extending along a second direction intersecting with the first direction, a clock signal line group includes multiple clock signal lines, signals of at least two clock signal lines respectively in at least two clock signal line groups are same; a first GOA circuit includes multiple first GOA units, multiple first GOA units in an m-th first GOA circuit are connected with at least one clock signal line in an m-th clock signal line group, and are connected with multiple first signal lines in an m-th first display region in one-to-one correspondence.

15 Claims, 8 Drawing Sheets

(58) Field of Classification Search
CPC . G09G 3/32; G09G 3/3674; G09G 2310/0267
See application file for complete search history.

(56) References Cited

U.S. PATENT DOCUMENTS

| | | | | |
|---|---|---|---|---|
| 2018/0197481 | A1* | 7/2018 | Choi | G09G 3/3266 |
| 2018/0204889 | A1 | 7/2018 | Yu et al. | |
| 2019/0066616 | A1* | 2/2019 | Zeng | H01L 27/124 |
| 2019/0148465 | A1 | 5/2019 | Yu et al. | |
| 2019/0333433 | A1 | 10/2019 | Zhu et al. | |
| 2020/0356063 | A1 | 11/2020 | Guzman et al. | |
| 2021/0256913 | A1 | 8/2021 | Hao et al. | |
| 2023/0196993 | A1* | 6/2023 | Lu | G09G 3/3266 345/214 |

FOREIGN PATENT DOCUMENTS

| | | | | | |
|---|---|---|---|---|---|
| CN | 209980755 | U | | 1/2020 | |
| CN | 112419977 | A | | 2/2021 | |
| CN | 112419985 | A | | 2/2021 | |
| CN | 113066414 | A | | 7/2021 | |
| CN | 113795815 | A | | 12/2021 | |
| KR | 10-2007-0000984 | A | | 1/2007 | |
| KR | 20170114217 | A | * | 10/2017 | G09G 3/3266 |
| WO | WO-2022110950 | A1 | * | 6/2022 | G09G 3/3208 |

* cited by examiner

DISPLAY PANEL AND DISPLAY APPARATUS

CROSS-REFERENCE TO RELATED APPLICATION

The present application is a U.S. National Phase Entry of International Application No. PCT/CN2022/103005 having an international filing date of Jun. 30, 2022, the content of which is incorporated into this application by reference.

TECHNICAL FIELD

Embodiments of the present disclosure relate to, but are not limited to, the field of display technologies, and particularly to a display panel and a display apparatus.

BACKGROUND

An Organic Light Emitting Diode (OLED) and Quantum-dot Light Emitting Diodes (QLED) are active light emitting display devices and have advantages of self-illumination, a wide angle of view, a high contrast ratio, a low power consumption, an extremely high response speed, lightness and thinness, bendability, and a low cost, etc.

With continuous development of display technologies, a display apparatus using the OLED or the QLED as a light emitting device and using a Thin Film Transistor (TFT) for controlling a signal has become a mainstream product in the field of display at present.

SUMMARY

The following is a summary of subject matters described herein in detail. The summary is not intended to limit the protection scope of claims.

In an aspect, an embodiment of the present disclosure provides a display panel, including: a display region and a non-display region that at least partially surrounds the display region; wherein, the display region includes M first display regions sequentially disposed along a first direction, wherein a first display region includes multiple first signal lines sequentially disposed along the first direction and extending along a second direction, the second direction intersects with the first direction; the non-display region includes M first gate driver on array circuits and M clock signal line groups, wherein a clock signal line group includes multiple clock signal lines, signals of at least two clock signal lines of all clock signal lines of the M clock signal line groups are the same, and the at least two clock signal lines are respectively located in at least two clock signal line groups of the M clock signal line groups; a first gate driver on array circuit includes multiple first gate driver on array units, wherein multiple first gate driver on array units in an m-th first gate driver on array circuit are connected with at least one clock signal line of multiple clock signal lines of an m-th clock signal line group, and multiple first gate driver on array units in an m-th first gate driver on array circuit are connected with multiple first signal lines in an m-th first display region in one-to-one correspondence, wherein M is a positive integer greater than or equal to 2, and m is a positive integer less than or equal to M.

In another aspect, an embodiment of the present disclosure also provides a display apparatus, including: the display panel described in the above embodiment.

Other characteristics and advantages of the present disclosure will be set forth in the following specification, and moreover, partially become apparent from the specification or are understood by implementing the present disclosure. Other advantages of the present disclosure may be achieved and obtained through solutions described in the specification and drawings.

Other aspects may be understood upon reading and understanding the drawings and the detailed description.

BRIEF DESCRIPTION OF DRAWINGS

The drawings are used for providing understanding of technical solutions of the present disclosure, constitute a part of the specification, and together with the embodiments of the present disclosure, are used for explaining the technical solutions of the present disclosure but do not form limitations on the technical solutions of the present disclosure. Shapes and sizes of each component in the drawings do not reflect actual scales, and are only intended to schematically illustrate contents of the present disclosure.

DETAILED DESCRIPTION

Figure 1:
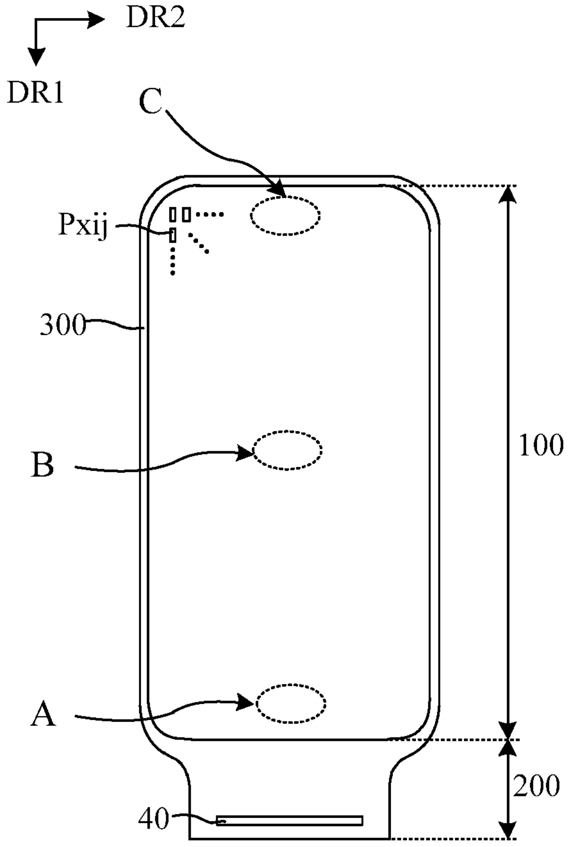
FIG. 1 is a schematic diagram of a structure of a display panel.

To make objectives, technical solutions, and advantages of the present disclosure clearer, the embodiments of the present disclosure will be described in detail with reference to the accompanying drawings. It is to be noted that implementations may be implemented in multiple different forms. Those of ordinary skills in the art may easily understand such a fact that modes and contents may be transformed into various forms without departing from the purpose and scope of the present disclosure. Therefore, the present disclosure should not be explained as being limited to contents described in following implementations only. The embodiments in the present disclosure and features in the embodiments may be combined randomly with each other without conflict. In order to make following description of the embodiments of the present disclosure clear and concise, detailed descriptions about part of known functions and known components are omitted in the present disclosure. The drawings of the embodiments of the present disclosure only involve structures involved in the embodiments of the present disclosure, and other structures may refer to usual designs.

Scales of the drawings in the present disclosure may be used as a reference in the actual process, but are not limited thereto. For example, a width-length ratio of a channel, a thickness and a pitch of each film layer, and the like may be adjusted according to actual needs. For example, in the drawings, a size of each constituent element, a thickness of a layer, or a region is exaggerated sometimes for clarity. Therefore, an implementation of the present disclosure is not necessarily limited to the size shown, and a shape and size of each component in the drawings do not reflect true proportions. In addition, the drawings schematically illustrate ideal examples, and one implementation of the present disclosure is not limited to the shapes, numerical values, or the like shown in the drawings.

The “first”, “second”, “third” and other ordinal numbers in the exemplary embodiments of the present disclosure are used to avoid confusion of constituent elements, not to provide any quantitative limitation.

In the exemplary embodiments of the present disclosure, for the sake of convenience, wordings such as “central”, “upper”, “lower”, “front”, “rear”, “vertical”, “horizontal”, “top”, “bottom”, “inner”, “outer” and the others describing the orientations or positional relations are used to depict the relationship of constituent elements with reference to the drawings, which are only for an easy and simplified description of the present disclosure, rather than for indicating or implying that the device or element referred to must have a specific orientation, or must be constructed and operated in a particular orientation, and therefore, those wordings cannot be construed as limitations on the present disclosure. The positional relationships between the constituent elements may be changed as appropriate according to a direction which is used for describing each constituent element. Therefore, appropriate replacements may be made according to situations without being limited to the wordings described in the specification.

In the exemplary embodiments of the present disclosure, the terms “install”, “connect” and “couple” shall be broadly understood unless otherwise explicitly specified and defined. For example, a connection may be a fixed connection, or a detachable connection, or an integrated connection. It may be a mechanical connection or an electrical connection. It may be a direct mutual connection, or an indirect connection through middleware, or internal communication between two components. Those of ordinary skills in the art may understand meanings of the above-mentioned terms in the present disclosure according to situations.

In the exemplary embodiments of the present disclosure, “an electrical connection” includes a case where constituent elements are connected via an element having a certain electrical effect. The “element with the certain electrical effect” is not particularly limited as long as electrical signals may be sent and received between the connected constituent elements. For example, “the element with the certain electrical effect” may be an electrode or wiring, or a switch element (such as a transistor), or other functional elements, such as a resistor, an inductor, a capacitor, or the like.

In the exemplary embodiments of the present disclosure, a transistor refers to an element that at least includes three terminals, i.e., a gate electrode (a gate or a control electrode), a drain electrode (a drain electrode terminal, a drain region, or a drain), and a source electrode (a source electrode terminal, a source region, or a source). A transistor has a channel region between a drain electrode and a source electrode, and a current can flow through the drain electrode, the channel region, and the source electrode. It is to be noted that, in the specification, the channel region refers to a region through which the current mainly flows.

In the exemplary embodiments of the present disclosure, in order to distinguish two electrodes of a transistor other than a gate electrode (a gate or a control electrode), one of the two electrodes is directly described as a first electrode, while the other is described as a second electrode. The first electrode may be a drain electrode, and the second electrode may be a source electrode. Or, the first electrode may be a source electrode, and the second electrode may be a drain electrode. In cases that transistors with opposite polarities are used, a current direction changes during operation of a circuit, or the like, functions of the “source electrode” and the “drain electrode” are sometimes interchangeable. Therefore, the “source electrode” and the “drain electrode” are interchangeable in the specification.

Transistors in the embodiments of the present disclosure may be Thin Film Transistors (TFTs), or Field Effect Transistors (FETs), or other devices with same characteristics. For example, a thin film transistor used in the embodiments of the present disclosure may include, but is not limited to, an oxide TFT or a Low Temperature Poly-silicon TFT (LTPS TFT). Here, the embodiments of the present disclosure are not limited to this.

In the exemplary embodiments of the present disclosure, “parallel” refers to a state in which two straight lines form an angle −10 degrees or more and 10 degrees or less, and thus also includes a state in which the angle is −5 degrees or more and 5 degrees or less. In addition, “perpendicular” refers to a state in which an angle formed by two straight lines is 80° or more and 100° or less, and thus also includes a state in which the angle is 85° or more and 95° or less.

In the exemplary embodiments of the present disclosure, “about” means that there is not strict limit for a value, and values within an error range during processes and measurement are allowed.

In order to facilitate better understanding of technical solutions of the present disclosure by those skilled in the art, technical terms that may be involved in exemplary embodiments of the present disclosure are briefly described below.

A method for driving an OLED may be classified as Passive Matrix (PM) driving and Active Matrix (AM) driving. Compared with the Passive Matrix Driving, the Active Matrix Driving has characteristics such as a large amount of display information, a low power consumption, a long device service life, and a high contrast of a screen, etc.

Gate Driver on Array (GOA) technology refers to a technology in which a drive circuit which controls a Gate of a Thin Film Transistor (TFT) is integrated on an array substrate of a display panel through a thin film transistor process, so as to reduce a cost of the drive circuit which controls the Gate in the panel, and achieve a narrow bezel of the panel. For example, a gate drive circuit (GOA) refers to a drive circuit that controls a gate, and may include multiple cascaded GOA units, wherein a GOA unit may be constructed as a form of a shift register. For example, divided according to functions of GOA units, the GOA unit may include: a Gate GOA unit, an Emission (EM) GOA unit, or a Reset (RS) GOA unit, etc., wherein the Gate GOA unit is configured to supply a scan signal to a pixel drive circuit in a sub-pixel, the EM GOA unit is configured to supply a light emitting control signal to the pixel drive circuit in the sub-pixel, and the Reset GOA unit is configured to supply a reset control signal to the pixel drive circuit in the sub-pixel. Correspondingly, a Gate signal supplied by the GOA unit may include a scan signal, a light emitting control signal, or a reset control signal, etc. For example, depending on types of transistors, the Gate GOA unit may include a Gate GOA N (GN) unit or a Gate GOA P (GP) unit, wherein the GN unit is configured to supply a scan signal to an N-type transistor in the pixel drive circuit in the sub-pixel, and the GP unit is configured to supply a scan signal to a P-type transistor in the pixel drive circuit in the sub-pixel.

A pulse width refers to a pulse width (time) of a pulse signal, rise time (Tr) refers to time when the pulse signal changes from a low level to a high level, and fall time (Tf) refers to time when the pulse signal changes from a high level to a low level, a unit of which is nanosecond (ns).

With development of the OLED technology, a requirement for a display effect is getting higher and higher. Image quality uniformity of an OLED display device is closely related to a pulse width of a Gate signal supplied by the Gate Drive Circuit (GOA). At present, in some technologies, in an OLED display device, a whole display screen adopts the same clock signal line CLOCK (for example, a first clock signal line GCK/second clock signal line GCB) to supply a clock signal. In a process for driving a panel, since loading of a trace of the clock signal line CLOCK becomes larger, Tr/Tfs of Gate signals at different positions of the display panel are inconsistent, resulting in a display Mura phenomenon.

For example, FIG. 1 is a schematic diagram of a structure of a display panel, and as shown in FIG. 1, on a plane parallel to the display panel, the display panel may include: a display region 100, a bonding region 200 located at a side of the display region 100 in a first direction DR1, and a bezel region 300 located at another side of the display region 100. The bonding region 200 may include a drive Integrated Circuit (IC) 40, and the display region 100 may include a first position A at a side close to the drive IC, a third position C at a side away from the drive IC, and a second position B between the first position A and the third position C. In some technologies, a solution in which the same group of clock signal lines CLOCK (e.g. first clock signal line GCK/second clock signal line GCB) supply clock signals to all GOA units in the whole display panel is generally adopted. As shown in Table 1, Tr/Tf of a clock signal line CLOCK at the first position A is about 275/312, Tr/Tf of a clock signal line CLOCK at the second position B is increased to about 363/412, and Tr/Tf of a clock signal line CLOCK at the third position C is increased to about 402/455. It can be seen that in a process for driving the display panel, farther away from the drive IC, greater the loading of the trace of the clock signal line CLOCK, and farther away from the drive IC, greater the delay of the clock signal line CLOCK, which will lead to inconsistency of Tr/Tfs of clock signal lines CLOCK at different positions of the display panel, so that inconsistent Tr/Tf of Gate signals outputted by the GOA circuit will be caused, thus reducing a display image quality.

In addition, in order to ensure the consistency of Tr/Tfs of Gate signals, in some techniques, for a clock signal line CLOCK (e.g. a first clock signal line GCK/second clock signal line GCB), a mode of double-layer traces with a first source-drain metal layer (SD1) and a second source-drain metal layer (SD2) is adopted, to reduce loading of the clock signal line. However, this will increase a Mask process of an SD2 film layer, which makes a preparation process more complicated and increases a production cost, thus is not conducive to application and popularization of products.

TABLE 1

Tr/Tfs at different positions of the display panel shown in FIG. 1

| | Tr (unit: ns) | Tf (unit: ns) |
|---|---|---|
| First position A | 274.7 | 319.9 |
| Second position B | 363.4 | 412.8 |
| Third position C | 401.7 | 454.5 |

In an exemplary embodiment of the present disclosure, the first direction DR1 may refer to a vertical direction or an extending direction of a data signal line, the second direction DR2 may refer to a horizontal direction or an extending direction of a scan signal line, and the third direction DR3 may refer to a thickness direction of the display panel, or a direction perpendicular to a plane of the display panel, etc. Herein, the first direction DR1 intersects with the second direction DR2, and the first direction DR1 intersects with the third direction DR3. For example, the first direction DR1 and the second direction DR2 may be perpendicular to each other, and the first direction DR1 and the third direction DR3 may be perpendicular to each other.

An embodiment of the present disclosure provides a display panel, wherein the display panel may include a display region and a non-display region that at least partially surrounds the display region. The display region may include: M first display regions sequentially disposed along the first direction DR1, and a first display region may include multiple first signal lines sequentially disposed along the first direction DR1 and extending along the second direction DR2, the second direction DR2 intersects with the first direction DR1. The non-display region may include M first GOA circuits and M clock signal line groups, wherein a clock signal line group may include multiple clock signal lines, signals of at least two clock signal lines of all the clock signal lines of the M clock signal line groups are the same, and at least two clock signal lines are respectively located in at least two clock signal line groups of the M clock signal line groups. A first GOA circuit may include multiple first GOA units, wherein multiple first GOA units in an m-th first GOA circuit are connected with at least one clock signal line of multiple clock signal lines of an m-th clock signal line group, and multiple first GOA units in the m-th first GOA circuit are connected with multiple first signal lines in an m-th first display region in one-to-one correspondence, wherein M is a positive integer greater than or equal to 2, and m is a positive integer less than or equal to M. As such, in the display panel according to the exemplary embodiment of the present disclosure, by dividing the display panel into at least M first display regions, and by dividing a GOA circuit of the display panel into M first GOA circuits corresponding to the M first display regions, a first GOA circuit is connected with multiple first signal lines in a corresponding first display region, so that multiple first signal lines in a corresponding first display region are driven by the same first GOA circuit. Then, a quantity of clock signal groups of the display panel is changed from one to M by adding the clock signal groups, so that the M clock signal line groups correspond to the M first display regions and the M first GOA circuits, and the M clock signal line groups are connected with the M first GOA circuits correspondingly. Thus, it can be avoided that one clock signal line group supplies a clock signal to all GOA units in the whole display panel. Therefore, difference of Tr/Tfs of clock signals of each clock signal line group can be reduced, difference of Tr/Tfs of signals of first signal lines in the first display region can be reduced, and difference of brightnesses at different positions in the display panel can be reduced. Therefore, compared with a solution in some technologies in which one clock signal line group is adopted to supply a clock signal to all GOA units in the whole display panel, the display panel according to the exemplary embodiment of the present disclosure achieves changing of a driving mode of the GOA circuit by additionally adding M−1 clock signal line groups and adjusting a design of clock signals of the GOA circuit, which can improve a macroscopic display Mura phenomenon caused by an inconsistency of Tr/Tfs of Gate signals at different positions of the display panel, and can achieve improvement of the display image quality.

In addition, compared with a solution in some technologies in which the clock signal line adopts double-layer traces, the display panel according to the exemplary embodiment of the present disclosure has a little changing on the prior process, neither increases a quantity of pattern processes nor increases a structural film layer, does not need to newly add Mask, has a simple preparation process, a relatively low production cost, is convenient for an implementation, and is beneficial to popularization and application of products.

In an exemplary embodiment, "signals of at least two clock signal lines of all clock signal lines of the M clock signal line groups are the same, and the at least two clock signal lines are respectively located in at least two clock signal line groups of the M clock signal line groups" may refer to that: in at least two clock signal line groups of the M clock signal line groups, at least one clock signal line of one clock signal line group is the same as at least one clock signal line of another clock signal line group. For example, taking a case where at least two clock signal line groups of the M clock signal line groups include a first clock signal line group and a second clock signal line group, the first clock signal line group may include a first clock signal line CK1 and a second clock signal line CK2, and the second clock signal line group may include a third clock signal line CK3 and a fourth clock signal line CK4, as an example, then "the signals of at least two clock signal lines are the same" may refer to that: a signal of the first clock signal line CK1 located in the first clock signal line group is the same as that of at least one of the third clock signal line CK3 and the fourth clock signal line CK4 located in the second clock signal line group; or, "the signals of at least two clock signal lines are the same" may refer to that: a signal of the second clock signal line CK2 located in the first clock signal line group is the same as that of at least one of the third clock signal line CK3 and the fourth clock signal line CK4 located in the second clock signal line group; or, "the signals of at least two clock signal lines are the same" may refer to that: a signal of one of the first clock signal line CK1 and the second clock signal line CK2 located in the first clock signal line group is the same as that of one of the third clock signal line CK3 and the fourth clock signal line CK4 located in the second clock signal line group, and a signal of the other one of the first clock signal line CK1 and the second clock signal line CK2 located in the first clock signal line group is the same as that of the other one of the third clock signal line CK3 and the fourth clock signal line CK4 located in the second clock signal line group.

In an exemplary embodiment, "the signals of at least two clock signal lines are the same" may refer to that: types of signals transmitted by the at least two clock signal lines are the same. For example, taking a case where signals of the first clock signal line CK1 and the third clock signal line CK3 are the same, as an example, the first clock signal line CK1 and the third clock signal line CK3 may both refer to a clock signal line GCK of the GOA circuit, or the first clock signal line CK1 and the third clock signal line CK3 may both refer to a clock signal line GCB of the GOA circuit, etc. Here, the embodiments of the present disclosure are not limited to this.

In an exemplary embodiment, multiple clock signal lines of the m-th clock signal line group may be input signal lines of a first GOA unit in the m-th first GOA circuit. Herein, the first GOA unit in the m-th first GOA circuit may generate a signal, such as a Gate signal, to be supplied to a first signal line connected with the first GOA unit using clock signals received from the multiple clock signal lines of the m-th clock signal line group or the like.

In an exemplary embodiment, M clock signal line groups are disposed at a side of the M first GOA circuits away from the display region.

In an exemplary embodiment, the M clock signal line groups are sequentially disposed along a direction close to the display region.

In an exemplary embodiment, multiple clock signal lines of a clock signal line group are sequentially disposed at a preset interval along a direction close to the display region.

In an exemplary embodiment, the non-display region may include: two clock signal line groups, three clock signal line groups, or four clock signal line groups. Of course, another quantity may also be used, and here, the embodiments of the present disclosure are not limited to this.

In an exemplary embodiment, line widths of multiple clock signal lines of each group of clock signal lines are equal. Here, a line width of a clock signal line may refer to a size of the clock signal line along the second direction DR2.

In an exemplary embodiment, multiple first GOA units in a first GOA circuit are cascaded, and multiple clock signal lines of the m-th clock signal line group may alternately output during a stage-by-stage transmission of multiple first GOA units in the m-th first GOA circuit.

In an exemplary embodiment, the first signal line may be an output signal line of a first GOA unit in a first GOA circuit, or may be an input signal line of a Gate of a thin film transistor. A signal of the first signal line may refer to a Gate signal outputted from the first GOA unit in the first GOA circuit to the gate of the thin film transistor.

In an exemplary embodiment, the first signal line may include: any one of a scan signal line, a light emitting control signal line, and a reset control signal line. Here, the embodiments of the present disclosure are not limited to this.

In an exemplary embodiment, the signal of the first signal line may include: any one of a scan signal, a light emitting control signal, and a reset control signal. Here, the embodiments of the present disclosure are not limited to this.

In an exemplary embodiment, quantities of first signal lines in the M first display regions are the same, or quantities of first signal lines in at least two first display regions of the M first display regions are different. Here, the embodiments of the present disclosure are not limited to this.

In an exemplary embodiment, the first GOA unit may include: any one of a Gate GOA unit, an EM GOA unit, and a Reset GOA unit. Here, the embodiments of the present disclosure are not limited to this.

In an exemplary embodiment, a total quantity of first GOA units in the M first GOA circuits may be the same or may be different. Here, the embodiments of the present disclosure are not limited to this.

In an exemplary embodiment, M may be a positive integer such as 2, 3, 4, 5, or 6, etc. For example, the display panel may include: two first display regions, and correspondingly, the display panel may also include: two first GOA circuits corresponding to in a one-to-one mode the two first display regions, and two clock signal line groups corresponding to in a one-to-one mode the two first display regions. For another example, the display panel may include: three first display regions, and correspondingly, the display panel may also include: three first GOA circuits corresponding to in a one-to-one mode the three first display regions, and three clock signal line groups corresponding to in a one-to-one mode the three first display regions. Of course, another quantity may also be used, and here, the embodiments of the present disclosure are not limited to this.

In an exemplary embodiment, the M display regions may be uniformly divided, or may be non-uniformly divided. Here, the embodiments of the present disclosure are not limited to this.

In an exemplary embodiment, a quantity of first display regions included in the display panel may be determined in a uniform division mode or a non-uniform division mode according to a quantity of pixel lines or a quantity of scan signal lines included in the display panel. For example, in the uniform division mode, quantities of pixel lines included in multiple first display regions may be equal; or, in the non-uniform division mode, quantities of pixel lines included in at least two display regions of multiple display regions may be unequal. Here, the embodiments of the present disclosure are not limited to this.

For example, the display panel as a Full High Definition (FHD) panel is taken as an example, for example, a quantity of pixel lines included in the display panel may be 1080, then, when the uniform division mode is adopted according to the quantity of pixel lines included in the display panel, the display region of the display panel may be divided into two first display regions, in this case a quantity of pixel lines included in each first display region may be 540, or the display region of the display panel may be divided into three first display regions, in this case a quantity of pixel lines included in each first display region may be 360. For another example, the display panel as an Ultra High Definition (UHD) panel is taken as an example, for example, a quantity of pixel lines included in the display panel may be 4320, then, when the uniform division mode is adopted according to the quantity of pixel lines included in the display panel, the display region of the display panel may be divided into two first display regions, in this case a quantity of pixel lines included in each first display region may be 2160, or, the display region of the display panel may be divided into three first display regions, in this case, a quantity of pixel lines included in each first display region may be 1440, or the display region of the display panel may be divided into four first display regions, in this case a quantity of pixel lines included in each first display region may be 1080.

In an exemplary embodiment, the display region may also include: a second display region located between two adjacent first display regions, wherein the second display region may include multiple second signal lines alternately disposed along the first direction DR1 and extending along the second direction DR2; the non-display region may also include a second GOA circuit corresponding to the second display region, wherein the second GOA circuit may include multiple second GOA units. An odd quantity of second GOA units are all connected with at least one clock signal line of multiple clock signal lines of a clock signal line group connected with one first display region of two adjacent first display regions. An even number of second GOA units are connected with at least one clock signal line of multiple clock signal lines of a clock signal line group connected to the other first display region of two adjacent first display regions, and the multiple second GOA units are connected with the multiple second signal lines in one-to-one correspondence.

In an exemplary embodiment, multiple clock signal lines of a clock signal line group connected to one first display region of two adjacent first display regions may be input signal lines of the odd quantity of second GOA units in the second GOA circuit, and multiple clock signal lines of a clock signal line group connected to the other first display region of two adjacent first display regions may be input signal lines of the even quantity of second GOA units in the second GOA circuit. The second GOA unit may generate a signal, such as a Gate signal, to be supplied to a second signal line connected to the second GOA unit using clock signals received from multiple clock signal lines or the like.

In an exemplary embodiment, the odd quantity of second GOA units in the second GOA circuit are cascaded, and multiple clock signal lines of a clock signal line group connected to one first display region of two adjacent first display regions may alternately output during a stage-by-stage transmission of the odd quantity of second GOA units in the second GOA circuit. The even quantity of second GOA units in the second GOA circuit are cascaded, and multiple clock signal lines of a clock signal line group connected to the other first display region of two adjacent first display regions may alternately output during a stage-by-stage transmission of the even quantity of second GOA units in the second GOA circuit.

In an exemplary embodiment, the second signal line may be an output signal line of the second GOA unit in the second GOA circuit, or may be an input signal line of a Gate of a thin film transistor. A signal of the second signal line may refer to a Gate signal outputted from the second GOA unit in the second GOA circuit to the gate of the thin film transistor.

In an exemplary embodiment, a type of the second GOA unit and a type of the first GOA unit may be the same.

In an exemplary embodiment, both the first GOA unit and the second GOA unit may include: any one of a gate (Gate) GOA unit, an emitting (EM) GOA unit, and a reset (Reset) GOA unit.

In an exemplary embodiment, a type of the second signal line and a type of the first signal line may be the same.

In an exemplary embodiment, the first signal line and the second signal line may each include: any one of a scan signal line, a light emitting control signal line, and a reset control signal line. Here, the embodiments of the present disclosure are not limited to this.

In an exemplary embodiment, the signal of the first signal line and the signal of the second signal line may each include: any one of a scan signal, a light emitting control signal, and a reset control signal. Here, the embodiments of the present disclosure are not limited to this As such, in the display panel according to the exemplary embodiment of the present disclosure, on the basis of disposing M first display regions and M first GOA circuits corresponding to them, a second display region located between two adjacent first display regions is also disposed, and a corresponding second GOA circuit is disposed for the second display region, so that the second GOA circuit is connected with multiple second signal lines in the corresponding second display region, which can achieve that multiple first signal lines in a corresponding first display region are driven by the first GOA circuit, and multiple second signal lines in the corresponding second display region are driven by the second GOA circuit. Then, clock signals are alternately supplied to the second GOA circuit through two clock signal line groups corresponding to two adjacent first display regions. In this way, on the basis of reducing an operating range of Tr/Tfs of clock signals of each clock signal line group, a split screen problem caused by Tr/Tf jump between two clock signal line groups corresponding to two adjacent first display regions can be avoided. Therefore, compared with a solution in some technologies in which one clock signal line group is adopted to supply a clock signal to all GOA units in the whole display panel, the display panel according to the exemplary embodiment of the present disclosure achieves changing of a driving mode of the GOA circuit by adding clock signal line groups and adjusting a design of clock signals of the GOA circuit, which can not only improve a macroscopic display Mura phenomenon caused by an inconsistency of Tr/Tfs of Gate signals at different positions of the display panel, but also avoid a split screen problem caused by Tr/Tf jump between two clock signal line groups corresponding to two adjacent first display regions, and can achieve more effective improvement of the display image quality.

In an exemplary embodiment, the quantity of second display regions is less than the quantity of first display regions. When the quantity of first display regions is M, the quantity of second display regions may be a positive integer less than or equal to M−1. For example, that the quantity of first display regions may be 2 is taken as an example, that is, M equals to 2, and correspondingly, the quantity of the second display regions may be 1. Or, that the quantity of first display regions may be 3 is taken as an example, that is, M equals to 3, and correspondingly, the quantity of the second display regions may be 1 or 2. Or, that the quantity of first display regions may be 4 is taken as an example, that is, M equals to 4, and correspondingly, the quantity of the second display regions may be 1, 2, or 3, etc. Here, the quantity of second display regions may be set by a person skilled in the art, and the embodiments of the present disclosure are not limited to this.

In an exemplary embodiment, when the quantity of first display regions is M, and the quantity of second display regions may be M−1, an n-th second display region may be disposed between an n-th first display region and an (n+1)-th first display region, wherein n may be a positive integer less than or equal to M−1. For example, taking a case where a quantity of the first display regions may be 3, and a quantity of the second display regions may be, 2, as an example, the display region may include: a first first display region, a second first display region and a third first display region arranged sequentially along a first direction, and the display region may also include a first second display region and a second second display region arranged sequentially along the first direction. The first second display region is arranged between the first first display region and the second first display region, and the second second display region is arranged between the second first display region and the third first display region. Here, the embodiments of the present disclosure are not limited to this.

In an exemplary embodiment, taking a case where the display panel may include a first display region and a second display region, as an example, the first display region and the second display region may both be uniformly divided or may both be non-uniformly divided. For example, according to the quantity of first display regions, a second display region is disposed between each two adjacent first display regions, or a second display region is not disposed between some two adjacent first display regions. For another example, a second display region is disposed only between two adjacent first display regions which satisfy a preset condition, wherein the preset condition may include, but is not limited to, relatively large difference of Tr/Tfs of Gate signals between two adjacent first display regions. Here, the embodiments of the present disclosure are not limited to this.

In an exemplary embodiment, a quantity of first display regions and a quantity of second display regions that the display panel may include may be determined in a uniform division mode, a non-uniform division mode, or a combination of both, according to a quantity of pixel lines or a quantity of scan signal lines that the display panel may include. For example, when the uniform division mode is adopted, quantities of pixel lines that multiple first display regions may include may be equal, or quantities of pixel lines that multiple second display regions may include may be equal, or a second display region is disposed between each adjacent two first display regions. For another example, when the non-uniform division mode is adopted, quantities of pixel lines that at least two first display regions of multiple first display regions may include may not be equal, or the second display region is disposed between some two adjacent first display regions, while no second display region is disposed between some other two adjacent first display regions. Here, the embodiments of the present disclosure are not limited to this.

In an exemplary embodiment, a quantity of second signal lines is less than a quantity of first signal lines.

In an exemplary embodiment, the quantity of second signal lines may be an even number greater than or equal to 4. Here, the embodiments of the present disclosure are not limited to this.

In an exemplary embodiment, a quantity of second GOA units in the second GOA circuit is smaller than a quantity of first GOA units in the first GOA circuit.

In an exemplary embodiment, a quantity of second GOA units in each second GOA circuit may be an even number greater than or equal to 4. For example, a quantity of second GOA units in the second GOA circuit may be 4, 6, 8, 10, or 12, etc. Here, the quantity of GOA units in the second GOA circuit may be appropriately set by a person skilled in the art according to a simulation result, and the embodiments of the present disclosure are not limited to this.

In an exemplary embodiment, a quantity of second GOA units in multiple second GOA circuits may be the same or may be different.

In an exemplary embodiment, the non-display region may include: a bonding region located at a side of the display region in the first direction, and a bezel region located at another side of the display region. The bonding region may include an integrated circuit, configured to output a clock signal to the M clock signal line groups, and the M first gate driver on array circuits and the M clock signal line groups are located in the bezel region. As such, the quantity of the clock signal groups of the display panel is changed from 1 to M by adding the clock signal groups, which can avoid that one clock signal line group supplies a clock signal to all GOA units in the whole display panel, and can improve a macroscopic display Mura phenomenon caused by larger loading of traces of a clock signal line CLOCK as farther away from a drive IC, a macroscopic display Mura phenomenon caused by larger delay of the clock signal line CLOCK as farther away from the drive IC, and a macroscopic display Mura phenomenon caused by an inconsistency of Tr/Tfs of Gate signals at different positions of the display panel, and can achieve improvement of the display image quality.

In an exemplary embodiment, the non-display region may include: a bonding region located at a side of the display region in a first direction, wherein the bonding region may include: an Integrated Circuit (IC), and the integrated circuit is configured to output a clock signal to M clock signal line groups, wherein, rise time of a clock signal of a k-th clock signal line group is less than rise time of a clock signal of a (k+1)-th clock signal line group, and fall time of the clock signal of the k-th clock signal line group is less than fall time of the clock signal of the (k+1)-th clock signal line group, k being a positive integer less than or equal to M−1. As such, an operating range of Tr/Tf of the clock signal of each clock signal line group can be reduced, difference of Tr/Tfs of signals of first signal lines in the first display region can be reduced more effectively, and difference of brightnesses at different positions in the display panel can be reduced, thus a macroscopic display Mura phenomenon caused by difference of Tr/Tfs of Gate signals at different positions of the display panel can be improved, achieving improvement of the display image quality.

In an exemplary embodiment, taking a case in which the bezel region may include two clock signal line groups, and each clock signal line group may include two clock signal lines, as an example, the two clock signal line groups may include a first clock signal line group corresponding to a first first display region, and a second clock signal line group corresponding to a second first display region, wherein the first clock signal line group may include a first clock signal line CK1 and a second clock signal line CK2, and the second clock signal line group may include a third clock signal line CK3 and a fourth clock signal line CK4, then, Tr/Tf of a clock signal outputted by the IC to the clock signal line group satisfies the following relationship: Tr of CK1/CK2<Tr of CK3/CK4, and Tf of CK1/ CK2<Tf of CLK3/CLK4. As another example, taking a case where the bezel region may include three clock signal line groups, and each clock signal line group may include two clock signal lines, as an example, the three clock signal line groups may include a first clock signal line group corresponding to a first first display region, a second clock signal line group corresponding to a second first display region, and a third clock signal line group corresponding to a third first display region, the first clock signal line group may include a first clock signal line CK1 and a second clock signal line CK2, the second clock signal line group may include a third clock signal line CK3 and a fourth clock signal line CK4, and the third clock signal line group may include a fifth clock signal line CK5 and a sixth clock signal line CK6, then, Tr/Tf of a clock signal outputted by the IC to the clock signal line group satisfies the following relationship: Tr of CK1/CK2<Tr of CK3/CK4<Tr of CK5/CK6, and Tf of CK1/CK2<Tf of CK3/CK4<Tf of CK5/CK6. Of course, according to a quantity the first display regions, a quantity of the clock signal line groups may be other values, and here, the embodiments of the present disclosure are not limited to this.

In an exemplary embodiment, the integrated circuit may be a drive IC chip.

In an exemplary embodiment, the integrated circuit may be bonded and connected to a drive chip region in the bonding region. For example, the integrated circuit may be bonded and connected to the drive chip region by an anisotropic conductive film or another mode, and a size of the integrated circuit in the second direction DR2 may be less than a width of the drive chip region in the second direction DR2, wherein the second direction DR2 intersects with the first direction DR1.

In an exemplary embodiment, multiple clock signal lines of each clock signal line group may be output signal lines of the integrated circuit, or may be input signal lines of the first GOA circuit or the second GOA circuit.

In an exemplary embodiment, a k-th clock signal line group is disposed at a side of a (k+1)-th clock signal line group away from the display region.

In an exemplary embodiment, the display panel may be an Active Matrix Organic Light Emitting Diode (AMOLED) display panel.

Structures of the display panel in the embodiments of the present disclosure will be described below with reference to the accompanying drawings. Here, traces, display regions, pixel lines, or GOA units in the drawings are only an exemplary illustration, quantities of traces, display regions, pixel lines, or GOA units, etc. do not represent actual quantities, and a type of GOA units does not represent an actual type.

Figure 2:
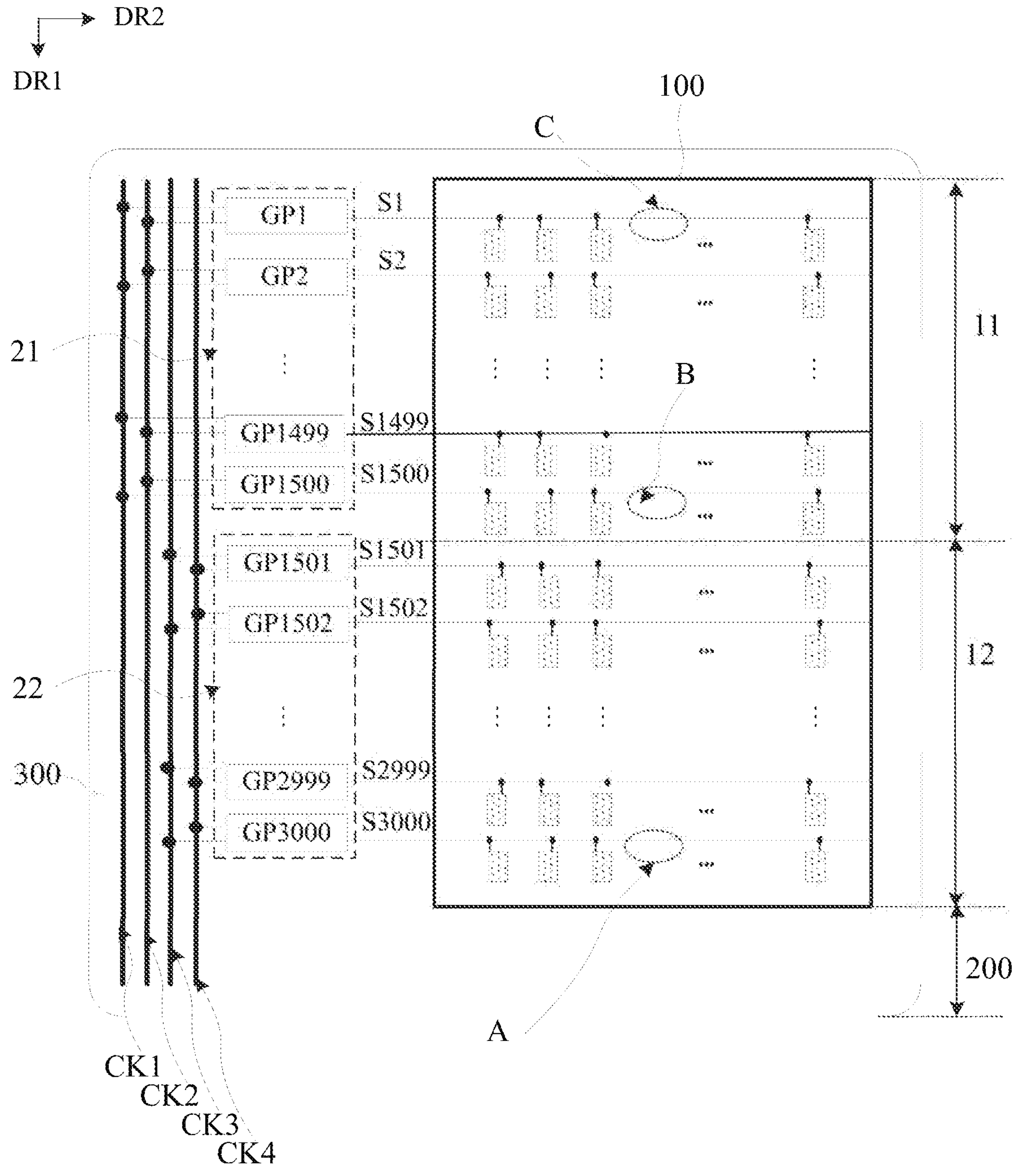
FIG. 2 is a schematic diagram of a first structure of a display panel in an exemplary embodiment of the present disclosure.
Figure 3:
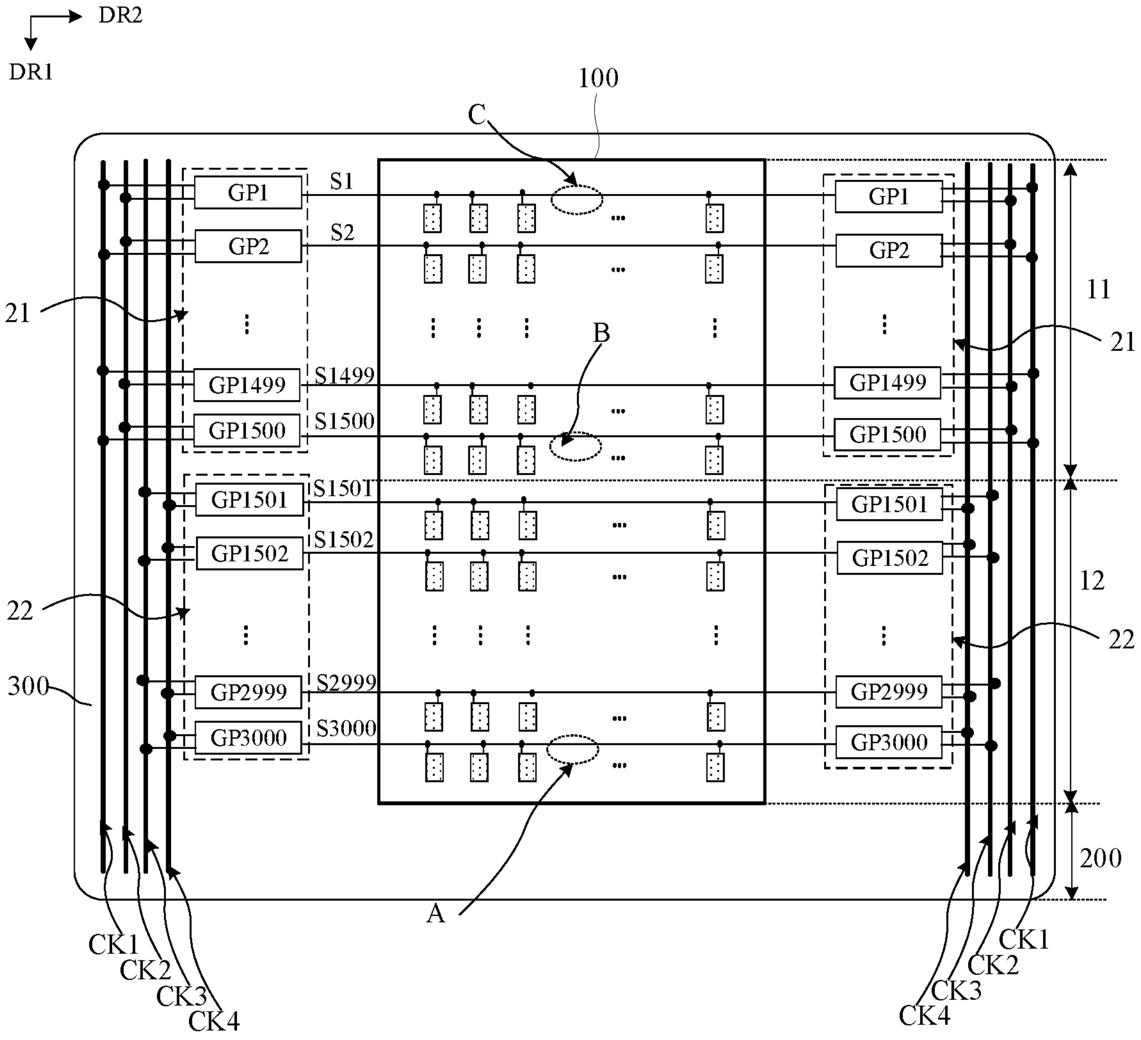
FIG. 3 is a schematic diagram of a second structure of a display panel in an exemplary embodiment of the present disclosure.

FIG. 2 is a schematic diagram of a first structure of a display panel in an exemplary embodiment of the present disclosure, and FIG. 3 is a schematic diagram of a second structure of a display panel in an exemplary embodiment of the present disclosure. In FIGS. 2 and 3, illustrations are made by taking a case where the display panel includes two first display regions, 3000 pixel lines, and two clock signal line groups, and each clock signal line group includes two clock signal lines, as an example.

In an exemplary embodiment, as shown in FIG. 2, on a plane parallel to the display panel, the display panel may include: a display region 100 and a non-display region that at least partially surrounds the display region 100, wherein the non-display region may include a bonding region 200 located at a side of the display region 100, and a bezel region 300 located at another side of the display region 100. For example, the bonding region 200 may be located at a side (a lower side) of the display region 100 in the first direction DR1. For example, the bezel region 300 may include M first GOA circuits and M clock signal line groups, and the bonding region 200 may include an integrated circuit (not shown in the figure), configured to output a clock signal to the M clock signal line groups.

In an exemplary embodiment, as shown in FIG. 2, the display region 100 may include: a first display region (an upper display region) 11 and a second display region (a lower display region) 12 which are sequentially disposed along a direction of the first direction DR1, wherein the first display region (the upper display region) 11 serves as a first first display region, and the second display region (the lower display region) 12 serves as a second first display region.

In an exemplary embodiment, as shown in FIG. 2, taking the display panel including 3000 pixel lines as an example, the display panel may include: 3000 scan signal lines (S1 to S3000) sequentially disposed along the first direction DR1 and extending along the second direction DR2, wherein the first display region 11 may include a first scan signal line S1 to a 1500th scan signal line S1500, and the second display region 12 may include a 1501st scan signal line S1501 to a 3000th scan signal line S3000. Here, the first scan signal line S1 to the 1500th scan signal line S1500 may serve as first signal lines, and the 1501st scan signal line S1501 to the 3000th scan signal line S3000 may serve as second signal lines.

In an exemplary embodiment, as shown in FIG. 2, the bezel region 300 may include: two clock signal line groups, wherein the two clock signal line groups may include a first clock signal line group and a second clock signal line group, and the first clock signal line group and the second clock signal line group may each include multiple clock signal lines. For example, each clock signal line group includes: two clock signal lines, wherein the first clock signal line group may include a first clock signal line CK1 and a second clock signal line CK2, and the second clock signal line group may include a third clock signal line CK3 and a fourth clock signal line CK4. For example, the first clock signal line CK1 to the fourth clock signal line CK4 are all disposed at a side of the first GOA circuit away from the display region 100. For example, the first clock signal line CK1 to the fourth clock signal line CK4 are sequentially disposed at an interval along a direction close to the display region 100. For example, line widths of the first clock signal line CK1, the second clock signal line CK2, the third clock signal line CK3, and the fourth clock signal line CK4 are equal. For example, signals of the first clock signal line CK1 and the third clock signal line CK3 are the same. For example, signals of the second clock signal line CK2 and the fourth clock signal line CK4 are the same.

In an exemplary embodiment, as shown in FIG. 2, the bezel region 300 may also include: a first GOA circuit 21 corresponding to the first display region 11 and a second GOA circuit 22 corresponding to the second display region 12. Herein, the first GOA circuit 21 serves as a first first GOA circuit corresponding to the first first display region, and the second GOA circuit 22 serves as a second first GOA circuit corresponding to the second first display region.

In an exemplary embodiment, as shown in FIG. 2, taking the GOA units being all Gate GOA P (GP) units, and the display panel including 3000 GOA units (GP1 to GP3000) as an example, the first GOA circuit 21 may include: a first-stage GOA unit GP1 to a 1500th-stage GOA unit GP1500, wherein the first-stage GOA unit GP1 to the 1500th-stage GOA unit GP1500 are each connected with the first clock signal line CK1 and the second clock signal line CK2 of the first clock signal line group, and the first-stage GOA unit GP1 to the 1500th-stage GOA unit GP1500 are connected with the first scan signal line S1 to the 1500th scan signal line S1500, respectively, in one-to-one correspondence. The second GOA circuit 22 may include: a 1501 st-stage GOA unit GP1501 to a 3000th-stage GOA unit GP3000, wherein the 1501st-stage GOA unit GP1501 to the 3000th-stage GOA unit GP3000 are each connected with the third clock signal line CK3 and the fourth clock signal line CK4 of the second clock signal line group, and the 1501st-stage GOA unit GP1501 to the 3000th-stage GOA unit GP3000 are connected with the 1501st scan signal line S1501 to the 3000th scan signal line S3000, respectively, in one-to-one correspondence. Here, the first-stage GOA unit GP1 to the 3000th-stage GOA unit GP3000 may serve as first GOA units. Thus, in an upper half of the display panel, the first clock signal line CK1 and the second clock signal line CK2 of the first clock signal line group are used to connect to the first first GOA circuit, and in a lower half of the display panel, the third clock signal line CK3 and the fourth clock signal line CK4 of the second clock signal line group are used to connect to the second first GOA circuit. As such, it can be avoided that one clock signal line group supplies a clock signal to all GOA units in the whole display panel. Thus, difference of Tr/Tfs of clock signals of each clock signal line group can be reduced, difference of Tr/Tfs of signals of first signal lines in the first display region can be reduced, and difference of brightnesses at different positions in the display panel can be reduced. Therefore, compared with a solution in some technologies in which one clock signal line group is adopted to supply a clock signal to all GOA units in the whole display panel, the display panel according to the exemplary embodiment of the present disclosure achieves changing of a driving mode of the GOA circuit by adding clock signal line groups and adjusting a design of clock signals of the GOA circuit, which can improve a macroscopic display Mura phenomenon caused by an inconsistency of Tr/Tfs of Gate signals at different positions of the display panel, and can achieve improvement of the display image quality.

In an exemplary embodiment, taking the GOA units being all Gate GOA P (GP) units, and the display panel including 3000 GOA units (GP1 to GP3000) as an example, a first-stage GOA unit GP1 to a 1500th-stage GOA unit GP1500 may be cascaded, and the first GOA circuit 21 may be configured to generate a scan signal to be supplied to scan signal lines (the first scan signal line S1 to the 1500th scan signal line S1500) of the first display region 11 by a clock signal received from the first clock signal line group or the like, so as to achieve progressive scanning of the scan signal lines of the first display region 11. For example, the first GOA circuit 21 may be configured to sequentially supply a scan signal having a turn-on level pulse to the scan signal lines S1, S2, . . . , and S1500 of the first display region 11. A 1501th-stage GOA unit GP1501 to a 3000th-stage GOA unit GP3000 may be cascaded, and the second GOA circuit 22 may be configured to generate a scan signal to be supplied to scan signal lines (the 1501th scan signal line S1501 to the 3000th scan signal line S3000) of the second display region 12 by a clock signal received from the second clock signal line group or the like, so as to achieve progressive scanning of the scan signal lines of the second display region 12. For example, the second GOA circuit 22 may be configured to sequentially supply a scan signal having a turn-on level pulse to the scan signal lines S1501, S1502, . . . , and S3000 of the second display region 12.

In an exemplary embodiment, as shown in FIG. 2, the display panel may adopt a unilateral driving mode, in this case multiple first GOA units in the first GOA circuit may be disposed at a side of the display region in the first direction DR1; or, as shown in FIG. 3, the display panel may adopt a bilateral driving mode, in this case multiple first GOA units in the first GOA circuit may be disposed at two sides of the display region in the first direction DR1. Here, the embodiments of the present disclosure are not limited to this.

The inventor of the present disclosure can obtain Tr/Tfs at different positions of the display panel shown in FIG. 2 through a simulation test. As shown in FIG. 2, the display region 100 may include: a first position A at a side close to the drive IC, a third position C at a side away from the drive IC, and a second position B located between the first position A and the third position C. As shown in Table 2, Tr/Tf of clock signals of the first second clock signal line CK1 and the second clock signal line CK2 at the first position A are respectively about 275/320, Tr/Tf of clock signals of the first clock signal line CK1 and the second clock signal line CK2 at the second position B are respectively about 363/413, and Tr/Tf of clock signals of the first clock signal line CK1 and the second clock signal line CK2 at the third position C are respectively about 402/455. Tr/Tf of clock signals of the third clock signal line CK3 and the fourth clock signal line CK4 at the first position A are respectively about 360/411, Tr/Tf of clock signals of the third clock signal line CK3 and the fourth clock signal line CK4 at the second position B are respectively about 405/454, and Tr/Tf of clock signals of the third clock signal line CK3 and the fourth clock signal line CK4 at the third position C are respectively about 440/500.

TABLE 2

Tr/Tfs at different positions of the display panel shown in FIG. 2

| | First clock signal line group (CK1/CK2) | | Second clock signal line group (CK3/CK4) | |
|---|---|---|---|---|
| | Tr (uint: ns) | Tf (unit: ns) | Tr (unit: ns) | Tf (unit: ns) |
| First position A | 274.7 | 319.9 | 360.1 | 411.3 |
| Second position B | 363.4 | 412.8 | 405.2 | 453.7 |
| Third position C | 401.7 | 454.5 | 439.8 | 498.6 |

Since in a first first display region 11 (an upper display region), a corresponding first first GOA circuit 21 (a first-stage first GOA unit GP1 to a 1500th-stage first GOA unit GP1500) is connected using a part of the first clock signal line CK1 and the second clock signal line CK2 located at the second position B to the third position C, in a process for driving the display panel, a range of Tr of a clock signal of a clock signal line corresponding to the first first display region 11 (the upper display region) may be about 363 to 402, and a range of Tf of the clock signal of the clock signal line corresponding to the first first display region 11 (the upper display region) may be about 413 to 455. Since in a second first display region 12 (a lower display region), a corresponding second first GOA circuit 22 (a 1501th-stage first GOA unit GP1501 to a 3000th-stage first GOA unit GP3000) is connected using a part of the third clock signal line CK3 and the fourth clock signal line CK4 located at the first position A to the second position B, in the process for driving the display panel, a range of Tr of a clock signal of a clock signal line corresponding to the second first display region 12 (the lower display region) may be about 360 to 405, and a range of Tf of the clock signal of the clock signal line corresponding to the second first display region 12 (the lower display region) may be about 411 to 454. Therefore, an operating range of Tr of clock signals of corresponding clock signal lines of the whole display panel may be about 360 to 405, an operating range of Tf of clock signals of corresponding clock signal lines of the whole display panel may be about 411 to 455.

It can be seen that compared with the solution of the display panel shown in FIG. 1, the display panel according to the exemplary embodiment of the present disclosure achieves changing of a driving mode of the GOA circuit by adding clock signal line groups and adjusting a design of clock signals of the GOA circuit, thereby the operating range of Trs of clock signals of corresponding clock signal lines of the whole display panel may be reduced from original 275 to 402 to 360 to 405, an operating range of Tfs of clock signals of corresponding clock signal lines of the whole display panel may be reduced from original 320 to 454 to 411 to 454. Thus, difference of Tr/Tfs of clock signals of clock signal lines is reduced, so that difference of Tr/Tfs of Gate signals in the display panel can be reduced, achieving reducing of difference of brightnesses at different positions of the display panel, improving a macroscopic display Mura phenomenon, and achieving improvement of the display image quality.

Figure 4:
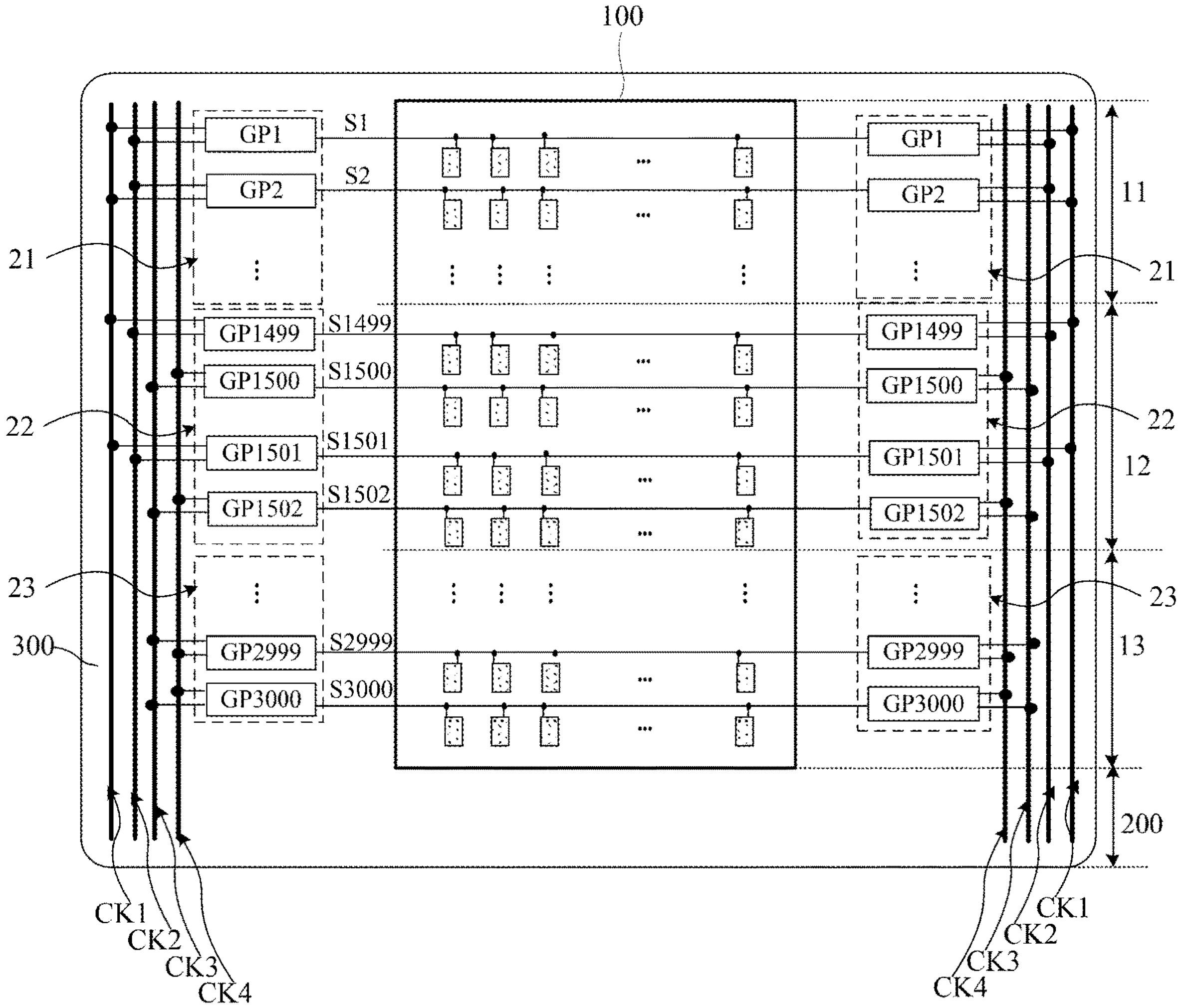
FIG. 4 is a schematic diagram of a third structure of a display panel in an exemplary embodiment of the present disclosure.
Figure 5:
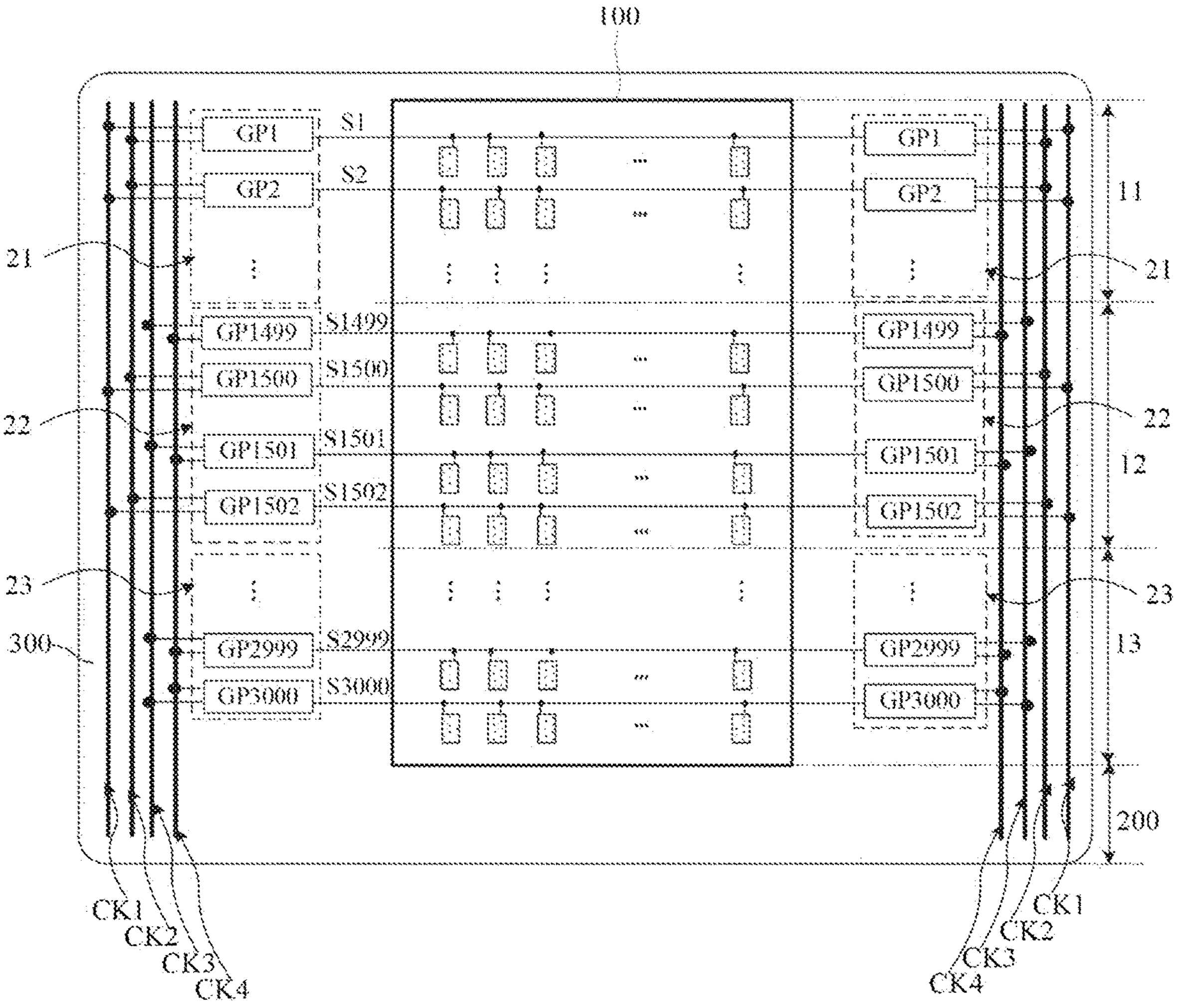
FIG. 5 is a schematic diagram of a fourth structure of a display panel in an exemplary embodiment of the present disclosure.

FIG. 4 is a schematic diagram of a third structure of a display panel in an exemplary embodiment of the present disclosure, and FIG. 5 is a schematic diagram of a fourth structure of a display panel in an exemplary embodiment of the present disclosure. Herein, illustrations are made in FIGS. 4 to 5 by taking the display panel including two first display regions and one second display region and the display panel including 3000 pixel lines, as an example, and illustrations are made in FIGS. 4 to 5 by taking the display panel including two clock signal line groups, and each clock signal line group including two clock signal lines, as an example.

In an exemplary embodiment, as shown in FIG. 4, on a plane parallel to the display panel, the display panel may include: a display region 100 and a non-display region that at least partially surrounds the display region 100, wherein the non-display region may include a bonding region 200 located at a side of the display region 100 and a bezel region 300 located at another side of the display region 100. For example, the bonding region 200 may be located at a side (a lower side) of the display region 100 in the first direction DR1. For example, the bezel region 300 may include M first GOA circuits and M clock signal line groups, and the bonding region 200 may include an integrated circuit (not shown in the figure), configured to output a clock signal to the M clock signal line groups.

In an exemplary embodiment, as shown in FIG. 4, the display region 100 may include: a first display region (an upper display region) 11, a second display region (a middle display region) 12, and a third display region (a lower display region) 13 which are sequentially disposed along a direction of the first direction DR1. The first display region (the upper display region) 11 serves as a first first display region, the second display region (the middle display region) 12 serves as a first second display region, and the third display region (the lower display region) 13 serves as a second first display region, that is, the second display region is disposed between two adjacent first display regions.

In an exemplary embodiment, as shown in FIG. 4, taking the display panel including 3000 pixel lines as an example, the display panel may include: 3000 scan signal lines (S1 to S3000) sequentially disposed along the first direction DR1 and extending along the second direction DR2, wherein the first display region 11 may include a first scan signal line S1 to a 1498th scan signal line S1498, the second display region 12 may include a 1499th scan signal line S1499 to a 1502nd scan signal line S1502, and the third display region 13 may include a 1503rd scan signal line S1503 to a 3000th scan signal line S3000. Here, the first scan signal line S1 to the 1498th scan signal line S1498 may serve as first signal lines, the 1499th scan signal line S1499 to the 1502nd scan signal line S1502 may serve as second signal lines, and the 1503rd scan signal line S1503 to the 3000th scan signal line S3000 may serve as first signal lines.

In an exemplary embodiment, as shown in FIG. 4, the bezel region 300 may include: two clock signal line groups, wherein the two clock signal line groups may include a first clock signal line group and a second clock signal line group, and the first clock signal line group and the second clock signal line group may each include multiple clock signal lines. For example, each clock signal line group includes: two clock signal lines, wherein the first clock signal line group may include a first clock signal line CK1 and a second clock signal line CK2, and the second clock signal line group may include a third clock signal line CK3 and a fourth clock signal line CK4. For example, the first clock signal line CK1 to the fourth clock signal line CK4 are all disposed at a side of the first GOA circuit away from the display region 100. For example, the first clock signal line CK1 to the fourth clock signal line CK4 are sequentially disposed at an interval along a direction close to the display region 100. For example, line widths of the first clock signal line CK1, the second clock signal line CK2, the third clock signal line CK3, and the fourth clock signal line CK4 are equal. For example, signals of the first clock signal line CK1 and the third clock signal line CK3 are the same. For example, signals of the second clock signal line CK2 and the fourth clock signal line CK4 are the same.

In an exemplary embodiment, as shown in FIG. 4, the bezel region 300 may also include: a first GOA circuit 21 corresponding to a first display region 11, a second GOA circuit 22 corresponding to a second display region 12, and a third GOA circuit 23 corresponding to a third display region 13. Herein, the first GOA circuit 21 serves as a first first GOA circuit corresponding to a first first display region, the second GOA circuit 22 serves as a first second GOA circuit corresponding to a first second display region, and the third GOA circuit 23 serves as a second first GOA circuit corresponding to a second first display region.

In an exemplary embodiment, as shown in FIG. 4, taking the GOA units being all Gate GOA P (GP) units, and the display panel including 3000 GOA circuits (GP1 to GP3000) as an example, the first GOA circuit 21 may include: a first-stage GOA unit GP1 to a 1498th-stage GOA unit GP1498, wherein the first-stage GOA unit GP1 to the 1498th-stage GOA unit GP1498 are all connected with the first clock signal line group, and the first-stage GOA unit GP1 to the 1498th-stage GOA unit GP1498 are respectively connected with the first scan signal line S1 to the 1498th scan signal line S1498 in one-to-one correspondence. The third GOA circuit 23 may include: a 1503rd-stage GOA unit GP1503 to a 3000th-stage GOA unit GP3000, wherein the 1503rd-stage GOA unit GP1503 to the 3000th-stage GOA unit GP3000 are all connected with the second clock signal line group, and the 1503rd-stage GOA unit GP1503 to the 3000th-stage GOA unit GP3000 are connected with the 1503rd scan signal line S1503 to the 3000th scan signal line S3000, respectively, in one-to-one correspondence. Here, the first-stage GOA unit GP1 to the 1498th-stage GOA unit GP1498 may serve as the first GOA unit, a 1499th-stage GOA unit GP1499 to a 1502nd-stage GOA unit GP1502 may serve as the second GOA unit, and the 1503rd-stage GOA unit GP1503 to the 3000th-stage GOA unit GP3000 may serve as the first GOA unit. Thus, in an upper half of the display panel, the first clock signal line CK1 and the second clock signal line CK2 of the first clock signal line group are used to connect to the first first GOA circuit, and in a lower half of the display panel, the third clock signal line CK3 and the fourth clock signal line CK4 of the second clock signal line group are used to connect to the second first GOA circuit. As such, it can be avoided that one clock signal line group supplies a clock signal to all GOA units in the whole display panel. Thus, difference of Tr/Tfs of clock signals of each clock signal line group can be reduced, difference of Tr/Tfs of signals of first signal lines in the first display region can be reduced, and difference of brightnesses at different positions in the display panel can be reduced. Therefore, compared with a solution in some technologies in which one clock signal line group is adopted to supply a clock signal to all GOA units in the whole display panel, the display panel according to the exemplary embodiment of the present disclosure achieves changing of a driving mode of the GOA circuit by adding clock signal line groups and adjusting a design of clock signals of the GOA circuit, which can improve a macroscopic display Mura phenomenon caused by an inconsistency of Tr/Tfs of Gate signals at different positions of the display panel, achieving improvement of the display image quality.

In an exemplary embodiment, as shown in FIGS. 4 and 5, the second GOA circuit 22 may include: the 1499th-stage GOA unit GP1499 to the 1502nd-stage GOA unit GP1502, wherein the 1499th-stage GOA unit GP1499 to the 1502nd-stage GOA unit GP1502 are alternately connected with the first clock signal line group and the second clock signal line group. For example, as shown in FIG. 4, the 1499th-stage GOA unit GP1499 is connected with the first clock signal line group and correspondingly connected with the 1499th scan signal line S1499, the 1500th-stage GOA unit GP1500 is connected with the second clock signal line group and correspondingly connected with the 1500th scan signal line S1500, the 1501st GOA unit GP1501 is connected with the first clock signal line group and correspondingly connected with the 1501st scan signal line S1501, and the 1502nd-stage GOA unit GP1502 is connected with the second clock signal line group and correspondingly connected with the 1502nd scan signal line S1502. Or, for example, as shown in FIG. 5, the 1499th-stage GOA unit GP1499 may be connected with the second clock signal line group and correspondingly connected with the 1499th scan signal line S1499, the 1500th-stage GOA unit GP1500 is connected with the first clock signal line group and correspondingly connected with the 1500th scan signal line S1500, the 1501st GOA unit GP1501 is connected with the second clock signal line group and correspondingly connected with the 1501st scan signal line S1501, and the 1502nd-stage GOA unit GP1502 is connected with the first clock signal line group and correspondingly connected with the 1502nd scan signal line S1502. Thus, the first clock signal line group and the second clock signal line group are used to alternately connect to the second GOA circuit in an intermediate transition part of the display panel. In this way, on the basis of reducing an operating range of Tr/Tfs of clock signals of each clock signal line group, a split screen problem caused by Tr/Tf jump appearing between two clock signal line groups corresponding to two adjacent first display regions can be avoided.

Figure 6:
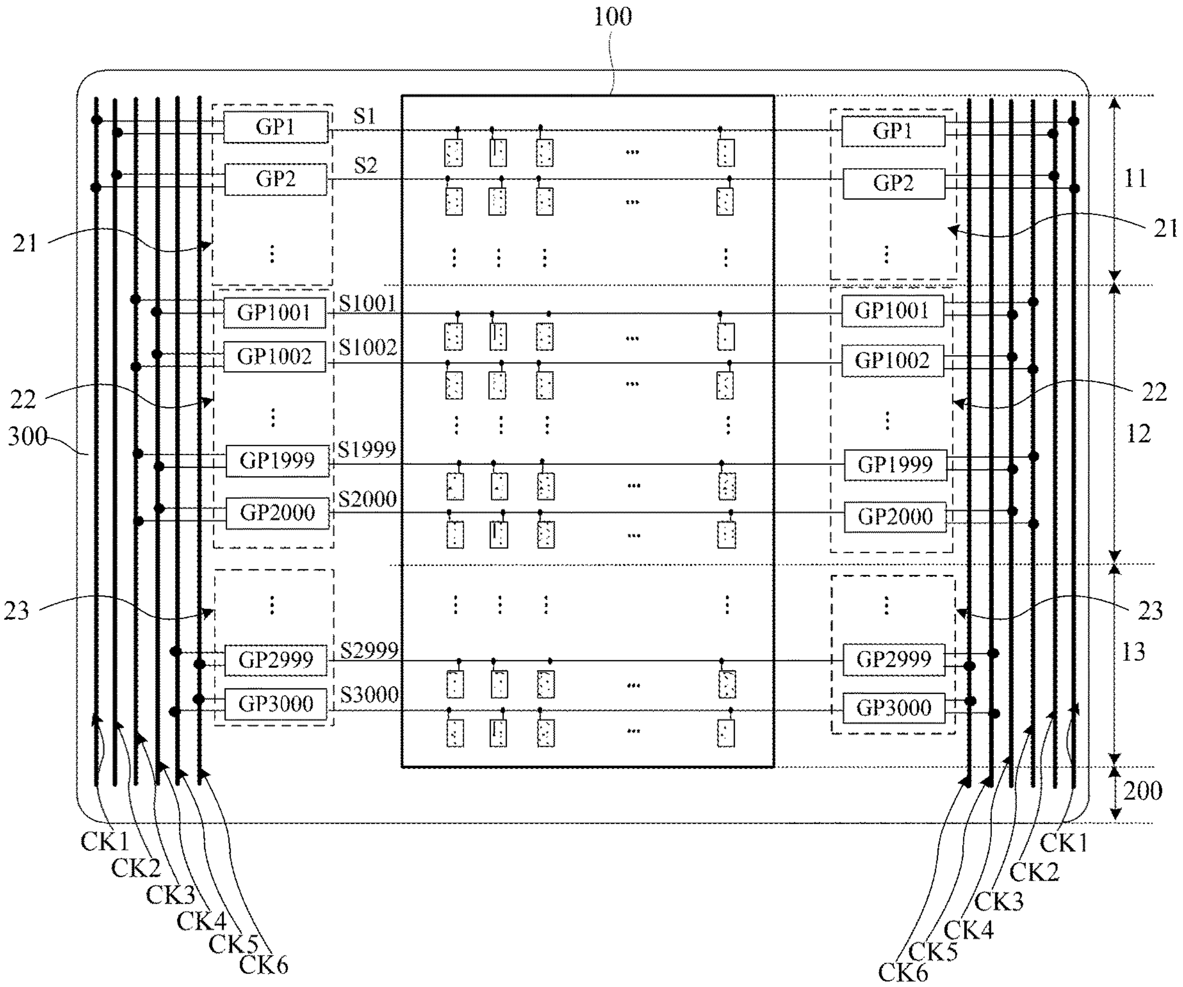
FIG. 6 is a schematic diagram of a fifth structure of a display panel in an exemplary embodiment of the present disclosure.

FIG. 6 is a schematic diagram of a fifth structure of a display panel in an exemplary embodiment of the present disclosure. In FIG. 6, an illustration is made by taking a case where the display panel includes three first display regions, 3000 pixel lines, and three clock signal line groups, and each clock signal line group includes two clock signal lines, as an example.

In an exemplary embodiment, as shown in FIG. 6, on a plane parallel to the display panel, the display panel may include: a display region 100 and a non-display region that at least partially surrounds the display region 100, wherein the non-display region may include a bonding region 200 located at a side of the display region 100 and a bezel region 300 located at another side of the display region 100. For example, the bonding region 200 may be located at a side (a lower side) of the display region 100 in the first direction DR1. For example, the bezel region 300 may include M first GOA circuits and M clock signal line groups, and the bonding region 200 may include an integrated circuit (not shown in the figure), configured to output a clock signal to the M clock signal line groups.

In an exemplary embodiment, as shown in FIG. 6, the display region 100 may include: a first display region (an upper display region) 11, a second display region (a middle display region) 12, and a third display region (a lower display region) 13 which are sequentially disposed along a direction of the first direction DR1, wherein the first display region (the upper display region) 11 serves as a first first display region, the second display region (the middle display region) 12 serves as a second first display region, and the third display region (the lower display region) 13 serves as a third first display region.

In an exemplary embodiment, as shown in FIG. 6, taking the display panel including 3000 pixel lines as an example, the display panel may include: 3000 scan signal lines (S1 to S3000) sequentially disposed along the first direction DRI and extending along the second direction DR2. The first display region 11 may include a first scan signal line S1 to a 1000th scan signal line S1000, the second display region 12 may include an S1001st scan signal line S1001 to a 2000th scan signal line S2000, and the third display region 13 may include an S2001st scan signal line S2001 to a 3000th scan signal line S3000. Here, 3000 scan signal lines (S1 to S3000) may all serve as first signal lines.

In an exemplary embodiment, as shown in FIG. 6, the bezel region 300 may include: three clock signal line groups, wherein the three clock signal line groups may include a first clock signal line group, a second clock signal line group, and a third clock signal line group, and the first clock signal line group, the second clock signal line group, and the third clock signal line group may each include multiple clock signal lines. For example, each clock signal line group includes: two clock signal lines, wherein the first clock signal line group may include a first clock signal line CK1 and a second clock signal line CK2, and the second clock signal line group may include a third clock signal line CK3 and a fourth clock signal line CK4, and the third clock signal line group may include a fifth clock signal line CK5 and a sixth clock signal line CK6. For example, the first clock signal line CK1 to the sixth clock signal line CK6 are all disposed at a side of the first GOA circuit away from the display region 100. For example, the first clock signal line CK1 to the sixth clock signal line CK4 are sequentially disposed at an interval along a direction close to the display region 100. For example, line widths of the first clock signal line CK1, the second clock signal line CK2, the third clock signal line CK3, the fourth clock signal line CK4, the fifth clock signal line CK5, and the sixth clock signal line CK6 are equal. For example, signals of the first clock signal line CK1, the third clock signal line CK3, and the fifth clock signal line CK5 are the same. For example, signals of the second clock signal line CK2, the fourth clock signal line CK4, and the sixth clock signal line CK6 are the same.

In an exemplary embodiment, as shown in FIG. 6, the bezel region 300 may also include: a first GOA circuit 21 corresponding to a first display region 11, a second GOA circuit 22 corresponding to a second display region 12, and a third GOA circuit 23 corresponding to a third display region 13. Herein, the first GOA circuit 21 serves as a first first GOA circuit corresponding to a first first display region, the second GOA circuit 22 serves as a second first GOA circuit corresponding to a second first display region, and the third GOA circuit 23 serves as a third first GOA circuit corresponding to a third first display region.

In an exemplary embodiment, as shown in FIG. 6, taking the GOA units being all Gate GOA P (GP) units, and the display panel including 3000 GOA units (GP1 to GP3000) as an example, the first GOA circuit 21 may include: a first-stage GOA unit GP1 to a 1000th-stage GOA unit GP1000, wherein the first-stage GOA unit GP1 to the 1000th-stage GOA unit GP1000 are each connected with the first clock signal line CK1 and the second clock signal line CK2 of the first clock signal line group, and the first-stage GOA unit GP1 to the 1000th-stage GOA unit GP1000 are connected with the first scan signal line S1 to the 1000th scan signal line S1000, respectively, in one-to-one correspondence. The second GOA circuit 22 may include: a 1001st-stage GOA unit GP1001 to a 2000th-stage GOA unit GP2000, wherein the 1001st-stage GOA unit GP1001 to the 2000th-stage GOA unit GP2000 are each connected with the third clock signal line CK3 and the fourth clock signal line CK4 of the second clock signal line group, and the 1001st-stage GOA unit GP1001 to the 2000th-stage GOA unit GP2000 are connected with the 1001st scan signal line S1001 to the 2000th scan signal line S2000, respectively, in one-to-one correspondence. The third GOA circuit 23 may include: a 2001st-stage GOA unit GP2001 to a 3000th-stage GOA unit GP3000, wherein the 2001st-stage GOA unit GP1 to the 3000th-stage GOA unit GP3000 are each connected with the fifth clock signal line CK5 and the sixth clock signal line CK6 of the third clock signal line group, and the 2001st-stage GOA unit GP2001 to the 3000th-stage GOA unit GP3000 are connected with the 2001st scan signal line S2001 to the 3000th scan signal line S3000, respectively, in one-to-one correspondence. Here, the first-stage GOA unit GP1 to the 3000th-stage GOA unit GP3000 may serve as first GOA units. Thus, in an upper part of the display panel, the first clock signal line CK1 and the second clock signal line CK2 of the first clock signal line group are used to connect to the first first GOA circuit, in a middle part of the display panel, the third clock signal line CK3 and the fourth clock signal line CK4 of the second clock signal line group are used to connect to the second first GOA circuit, and in a lower part of the display panel, the fifth clock signal line CK5 and the sixth clock signal line CK6 of the third clock signal line group are used to connect to the third first GOA circuit. As such, it can be avoided that one clock signal line group supplies a clock signal to all GOA units in the whole display panel. Thus, difference of Tr/Tfs of clock signals of each clock signal line group can be reduced, difference of Tr/Tfs of signals of first signal lines in the first display region can be reduced, and difference of brightnesses at different positions in the display panel can be reduced. Therefore, compared with a solution in some technologies in which one clock signal line group is adopted to supply a clock signal to all GOA units in the whole display panel, the display panel according to the exemplary embodiment of the present disclosure achieves changing of a driving mode of the GOA circuit by adding clock signal line groups and adjusting a design of clock signals of the GOA circuit, which can improve a macroscopic display Mura phenomenon caused by an inconsistency of Tr/Tfs of Gate signals at different positions of the display panel, and can achieve improvement of the display image quality.

In an exemplary embodiment, taking the GOA units being all Gate GOA P (GP) units, and the display panel including 3000 GOA units (GP1 to GP3000) as an example, a first-stage GOA unit GP1 to a 1000th-stage GOA unit GP1000 may be cascaded, and the first GOA circuit 21 may be configured to generate a scan signal to be supplied to scan signal lines (the first scan signal line S1 to the 1000th scan signal line S1000) of the first display region 11 by a clock signal received from the first clock signal line group or the like, so as to achieve progressive scanning of the scan signal lines of the first display region 11. For example, the first GOA circuit 21 may be configured to sequentially supply a scan signal having a turn-on level pulse to the scan signal lines S1, S2, . . . , and S1000 of the first display region 11. A 1001th-stage GOA unit GP1001 to a 2000th-stage GOA unit GP2000 may be cascaded, and the second GOA circuit 22 may be configured to generate a scan signal to be supplied to scan signal lines (the 1001th scan signal line S1001 to the 2000th scan signal line S2000) of the second display region 12 by a clock signal received from the second clock signal line group or the like, so as to achieve progressive scanning of the scan signal lines of the second display region 12. For example, the second GOA circuit 22 may be configured to sequentially supply a scan signal having a turn-on level pulse to the scan signal lines S1001, S1002, . . . , and S2000 of the second display region 12. The 2001th-stage GOA unit GP2001 to the 3000th-stage GOA unit GP3000 may be cascaded, and the third GOA circuit 23 may be configured to generate a scan signal to be supplied to scan signal lines (such as the 2001th scan signal line S2001 to the 3000th scan signal line S3000) of the third display region 13 by a clock signal received from the third clock signal line group (such as the fifth clock signal line CK5 and the sixth clock signal line CK6), so as to achieve progressive scanning of the scan signal lines of the third display region 13. For example, the third GOA circuit 23 may be configured to sequentially supply a scan signal having a turn-on level pulse to the scan signal lines S2001, S2002, . . . , and S3000 of the third display region 13.

Figure 7:
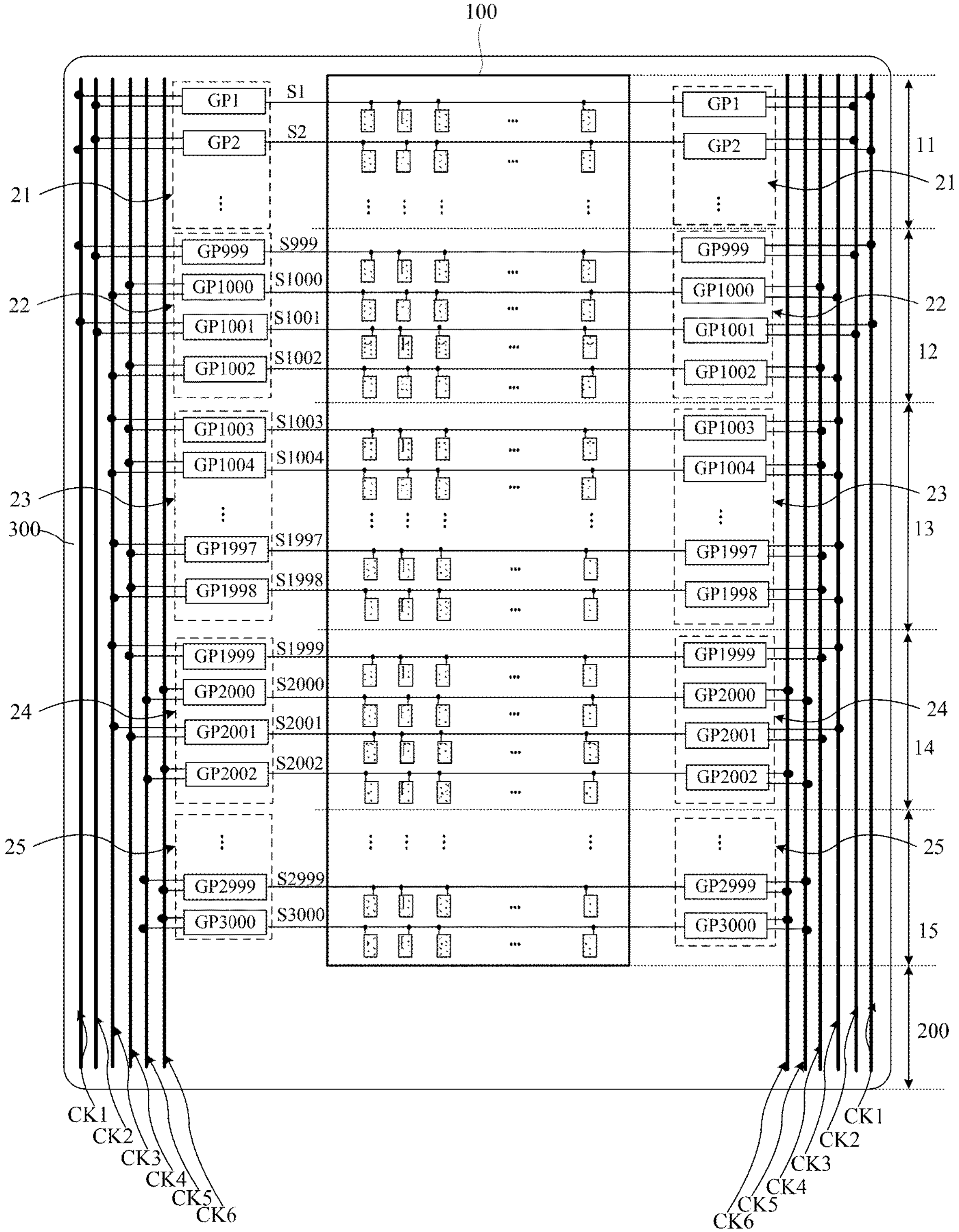
FIG. 7 is a schematic diagram of a sixth structure of a display panel in an exemplary embodiment of the present disclosure.

FIG. 7 is a schematic diagram of a fifth structure of a display panel in an exemplary embodiment of the present disclosure. In FIG. 7, an illustration is made by taking a case where the display panel includes three first display regions, two second display regions, 3000 pixel lines, and three clock signal line groups, and each clock signal line group includes two clock signal lines, as an example.

In an exemplary embodiment, as shown in FIG. 7, on a plane parallel to the display panel, the display panel may include: a display region 100 and a non-display region that at least partially surrounds the display region 100, wherein the non-display region may include a bonding region 200 located at a side of the display region 100 and a bezel region 300 located at another side of the display region 100. For example, the bonding region 200 may be located at a side (a lower side) of the display region 100 in the first direction DR1. For example, the bezel region 300 may include M first GOA circuits and M clock signal line groups, and the bonding region 200 may include an integrated circuit (not shown in the figure), configured to output a clock signal to the M clock signal line groups.

In an exemplary embodiment, as shown in FIG. 7, the display region 100 may include: a first display region 11, a second display region 12, a third display region 13, a fourth display region 14, and a fifth display region 15 sequentially arranged along the first direction DR1, wherein the first display region (an upper display region) 11 serves as a first first display region, the third display region serves as a second first display region, the fifth display region 15 serves as a third first display region, the second display region 12 serves as a first second display region, and the fourth display region 14 serves as a second second display region, that is, the second display region is disposed between two adjacent first display regions.

In an exemplary embodiment, as shown in FIG. 7, taking the display panel including 3000 pixel lines as an example, the display panel may include: 3000 scan signal lines (S1 to S3000) sequentially disposed along the first direction DR1 and extending along the second direction DR2. The first display region 11 may include a first scan signal line S1 to a 998th scan signal line S998, the second display region 12 may include a 999th scan signal line S999 to a 1002nd scan signal line S1002, and the third display region 13 may include a 1003rd scan signal line S1003 to a 1998th scan signal line S1998, the fourth display region 14 may include a 1999th scan signal line S1999 to a 2002nd scan signal line S2002, and the fifth display region 15 may include a S2003rd scan signal line S2003 to a 3000th scan signal line S3000. Here, the first scan signal line S1 to the 998th scan signal line S998, the 1003th scan signal line S1003 to the 1998th scan signal line S1998, and the 2003th scan signal line S2003 to the 3000th scan signal line S3000 may all serve as first signal lines. The 999th scan signal line S999 to the 1002nd scan signal line S1002, and the 1999th scan signal line S1999 to the 2002th scan signal line S2002 may all serve as second signal lines.

In an exemplary embodiment, as shown in FIG. 7, the bezel region 300 may include: three clock signal line groups, wherein the three clock signal line groups may include a first clock signal line group, a second clock signal line group, and a third clock signal line group, and the first clock signal line group, the second clock signal line group, and the third clock signal line group may each include multiple clock signal lines. For example, each clock signal line group includes: two clock signal lines, wherein the first clock signal line group may include a first clock signal line CK1 and a second clock signal line CK2, and the second clock signal line group may include a third clock signal line CK3 and a fourth clock signal line CK4, and the third clock signal line group may include a fifth clock signal line CK5 and a sixth clock signal line CK6. For example, the first clock signal line CK1 to the sixth clock signal line CK6 are all disposed at a side of the first GOA circuit away from the display region 100. For example, the first clock signal line CK1 to the sixth clock signal line CK4 are sequentially disposed at an interval along a direction close to the display region 100. For example, line widths of the first clock signal line CK1, the second clock signal line CK2, the third clock signal line CK3, the fourth clock signal line CK4, the fifth clock signal line CK5, and the sixth clock signal line CK6 are equal. For example, signals of the first clock signal line CK1, the third clock signal line CK3, and the fifth clock signal line CK5 are the same. For example, signals of the second clock signal line CK2, the fourth clock signal line CK4, and the sixth clock signal line CK6 are the same.

In an exemplary embodiment, as shown in FIG. 7, the bezel region 300 may also include: a first GOA circuit 21 corresponding to a first display region 11, a second GOA circuit 22 corresponding to a second display region 12, a third GOA circuit 23 corresponding to a third display region 13, a fourth GOA circuit 24 corresponding to a fourth display region 14, and a fifth GOA circuit 25 corresponding to a fifth display region 15. Herein, the first GOA circuit 21 serves as a first first GOA circuit corresponding to a first first display region, the third GOA circuit 23 serves as a second first GOA circuit corresponding to a second first display region, and the fifth GOA circuit 25 serves as a third first GOA circuit corresponding to a third first display region. The second GOA circuit 22 serves as a first second GOA circuit corresponding to a first second display region, and the fourth GOA circuit 24 serves as a second second GOA circuit corresponding to a second second display region.

In an exemplary embodiment, as shown in FIG. 7, taking the GOA units being all Gate GOA P (GP) units, and the display panel including 3000 GOA units (GP1 to GP3000) as an example, the first GOA circuit 21 may include: a first-stage GOA unit GP1 to a 998th-stage GOA unit GP998, wherein the first-stage GOA unit GP1 to the 998th-stage GOA unit GP998 are each connected with the first clock signal line CK1 and the second clock signal line CK2 of the first clock signal line group, and the first-stage GOA unit GP1 to the 998th-stage GOA unit GP998 are connected with a first scan signal line S1 to a 998th scan signal line S998, respectively, in one-to-one correspondence. The third GOA circuit 23 may include: a 1003rd-stage GOA unit GP1003 to a 1998th-stage GOA unit GP1998, wherein the 1003rd-stage GOA unit GP1003 to the 1998th-stage GOA unit GP1998 are each connected with the third clock signal line CK3 and the fourth clock signal line CK4 of the second clock signal line group, and the 1003rd-stage GOA unit GP1001 to the 1998th-stage GOA unit GP1998 are connected with a 1003rd scan signal line S1003 to a 1998th scan signal line S1998, respectively, in one-to-one correspondence. The fifth GOA circuit 25 may include: a 2003rd-stage GOA unit GP2003 to a 3000th-stage GOA unit GP3000, wherein the 2003rd-stage GOA unit GP2003 to the 3000th-stage GOA unit GP3000 are each connected with the fifth clock signal line CK5 and the sixth clock signal line CK6 of the third clock signal line group, and the 2003rd-stage GOA unit GP2003 to the 3000th-stage GOA unit GP3000 are connected with a 2003rd scan signal line S2003 to a 3000th scan signal line S3000, respectively, in one-to-one correspondence. Here, the first-stage GOA unit GP1 to the 998th-stage GOA unit GP998, the 1003rd-stage GOA unit GP1003 to the 1998th-stage GOA unit GP1998, and the 2003rd-stage GOA unit GP2003 to the 3000th-stage GOA unit GP3000 may serve as first GOA units. Thus, in an upper part of the display panel, the first clock signal line CK1 and the second clock signal line CK2 of the first clock signal line group are used to connect to the first first GOA circuit, in a middle part of the display panel, the third clock signal line CK3 and the fourth clock signal line CK4 of the second clock signal line group are used to connect to the second first GOA circuit, and in a lower part of the display panel, the fifth clock signal line CK5 and the sixth clock signal line CK6 of the third clock signal line group are used to connect to the third first GOA circuit. As such, it can be avoided that one clock signal line group supplies a clock signal to all GOA units in the whole display panel. Thus, difference of Tr/Tfs of clock signals of each clock signal line group can be reduced, difference of Tr/Tfs of signals of first signal lines in the first display region can be reduced, and difference of brightnesses at different positions in the display panel can be reduced. Therefore, compared with a solution in some technologies in which one clock signal line group is adopted to supply a clock signal to all GOA units in the whole display panel, the display panel according to the exemplary embodiment of the present disclosure achieves changing of a driving mode of the GOA circuit by adding clock signal line groups and adjusting a design of clock signals of the GOA circuit, which can improve a macroscopic display Mura phenomenon caused by an inconsistency of Tr/Tfs of Gate signals at different positions of the display panel, and can achieve improvement of the display image quality.

In an exemplary embodiment, as shown in FIG. 7, the second GOA circuit 22 may include: a 999th-stage GOA unit GP999 to a 1002nd-stage GOA unit GP1002, wherein the 999th-stage GOA unit GP999 to the 1002nd-stage GOA unit GP1002 are alternately connected with the first clock signal line group and the second clock signal line group. The fourth GOA circuit 24 may include: a 1999th-stage GOA unit GP1999 to a 2002nd-stage GOA unit GP2002, wherein the 1999th-stage GOA unit GP1999 to the 2002nd-stage GOA unit GP2002 are alternately connected with the second clock signal line group and the third clock signal line group. Thus, a transition part is disposed between the first first display region and the second first display region of the display panel, the first clock signal line group and the second clock signal line group are used to alternately connect to the second GOA circuit, and a transition part is disposed between the second first display region and the third first display region of the display panel, and the second clock signal line group and the third clock signal line group are used to alternately connect to the second GOA circuit. In this way, on the basis of reducing an operating range of Tr/Tfs of clock signals of each clock signal line group, a split screen problem caused by Tr/Tf jump between two clock signal line groups corresponding to two adjacent first display regions can be avoided.

For example, as shown in FIG. 7, the 999th-stage GOA unit GP999 is connected with the first clock signal line group and correspondingly connected with the 999th scan signal line S999, the 1000th-stage GOA unit GP1000 is connected with the second clock signal line group and correspondingly connected with the 1000th scan signal line S1000, the 1001st GOA unit GP1001 is connected with the first clock signal line group and correspondingly connected with the 1001st scan signal line S1001, and the 1002nd-stage GOA unit GP1002 is connected with the second clock signal line group and correspondingly connected with the 1002nd scan signal line S1002. The 1999th-stage GOA unit GP1999 is connected with the second clock signal line group and correspondingly connected with a 1999th scan signal line S1999, the 2000th-stage GOA unit GP2000 is connected with the third clock signal line group and correspondingly connected with a 2000th scan signal line S2000, the 2001st-stage GOA unit GP2001 is connected with the second clock signal line group and correspondingly connected with a 2001st scan signal line S2001, and the 2002nd-stage GOA unit GP2002 is connected with the third clock signal line group and correspondingly connected with a 2002nd scan signal line S2002.

Or, the 999th-stage GOA unit GP999 may be connected with the second clock signal line group and correspondingly connected with the 999th scan signal line S999, the 1000th-stage GOA unit GP1000 is connected with the first clock signal line group and correspondingly connected with the 1000th scan signal line S1000, the 1001st GOA unit GP1001 is connected with the second clock signal line group and correspondingly connected with the 1001st scan signal line S1001, and the 1002nd-stage GOA unit GP1002 is connected with the first clock signal line group and correspondingly connected with the 1002nd scan signal line S1002. The 1999th-stage GOA unit GP1999 is connected with the third clock signal line group and correspondingly connected with the 1999th scan signal line S1999, the 2000th-stage GOA unit GP2000 is connected with the second clock signal line group and correspondingly connected with the 2000th scan signal line S2000, the 2001st-stage GOA unit GP2001 is connected with the third clock signal line group and correspondingly connected with the 2001st scan signal line S2001, and the 2002nd-stage GOA unit GP2002 is connected with the second clock signal line group and correspondingly connected with the 2002nd scan signal line S2002.

In an exemplary embodiment, taking the GOA units being all Gate GOA P (GP) units, and the display panel including 3000 GOA units (GP1 to GP3000) as an example, a first-stage GOA unit GP1 to a 1000th-stage GOA unit GP1000 may be cascaded, and the first GOA circuit 21 may be configured to generate a scan signal to be supplied to scan signal lines (the first scan signal line S1 to the 1000th scan signal line S1000) of the first display region 11 by a clock signal received from the first clock signal line group or the like, so as to achieve progressive scanning of the scan signal lines of the first display region 11. For example, the first GOA circuit 21 may be configured to sequentially supply a scan signal having a turn-on level pulse to the scan signal lines S1, S2, . . . , and S1000 of the first display region 11. A 1001th-stage GOA unit GP1001 to a 2000th-stage GOA unit GP2000 may be cascaded, and the second GOA circuit 22 may be configured to generate a scan signal to be supplied to scan signal lines (the 1001th scan signal line S1001 to the 2000th scan signal line S2000) of the third display region 13 by a clock signal received from the second clock signal line group or the like, so as to achieve progressive scanning of the scan signal lines of the third display region 13. For example, the second GOA circuit 22 may be configured to sequentially supply a scan signal having a turn-on level pulse to the scan signal lines S1001, S1002, . . . , and S2000 of the third display region 13. A 2001th-stage GOA unit GP2001 to a 3000th-stage GOA unit GP3000 may be cascaded, and the third GOA circuit 23 may be configured to generate a scan signal to be supplied to scan signal lines (such as the 2001th scan signal line S2001 to the 3000th scan signal line S3000) of the fifth display region 15 by a clock signal received from the third clock signal line group (such as the fifth clock signal line CK5 and the sixth clock signal line CK6) or the like, so as to achieve progressive scanning of the scan signal lines of the fifth display region 15. For example, the third GOA circuit 23 may be configured to sequentially supply a scan signal having a turn-on level pulse to the scan signal lines S2001, S2002, . . . , and S3000 of the fifth display region 15.

An embodiment of the present disclosure also provides a display apparatus. The display apparatus may include: the display panel in one or more of the above exemplary embodiments.

In an exemplary embodiment, the display apparatus may include but is not limited to an LCD display apparatus or the like, for example, may be a vehicle-mounted display apparatus. Here, the embodiment of the present disclosure is not limited to this.

In an exemplary embodiment, taking the display apparatus being a vehicle-mounted display apparatus as an example, when a size of the vehicle-mounted display apparatus is less than 15 inches, a display panel including two clock signal lines per clock signal line may be adopted to achieve GOA bilateral driving; or, when a size of the vehicle-mounted display apparatus is greater than 15 inches, a display panel including four clock signal lines per clock signal line may be adopted to achieve GOA bilateral driving.

Figure 8:
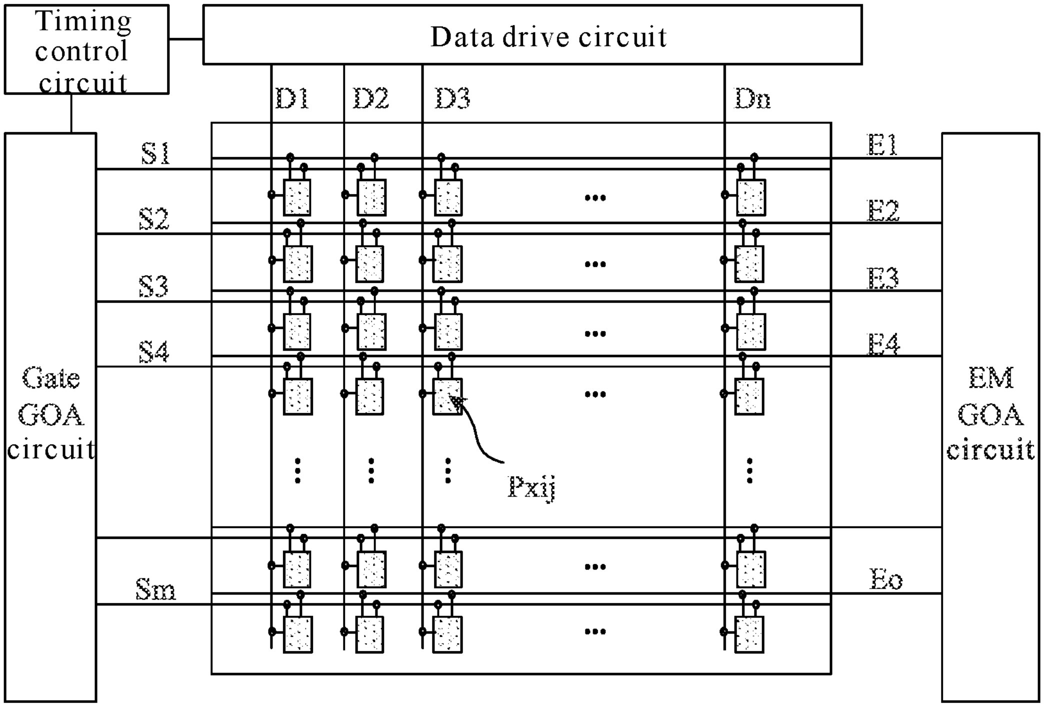
FIG. 8 is a schematic diagram of a structure of a display apparatus in an embodiment of the present disclosure.

FIG. 8 is a schematic diagram of a structure of a display apparatus in an embodiment of the present disclosure. As shown in FIG. 8, the display panel may include: a timing control circuit, a data drive circuit, a Gate GOA circuit, an EM GOA circuit, and a pixel array, wherein the timing control circuit is respectively connected with the data drive circuit, the Gate GOA circuit, and the EM GOA circuit, the data drive circuit is respectively connected with multiple data signal lines (D1 to Dn), the Gate GOA circuit is respectively connected with multiple scan signal lines (S1 to Sm), and the EM GOA circuit is respectively connected with multiple light emitting signal lines (E1 to Eo). The pixel array may include multiple sub-pixels Pxij, wherein i and j may be natural numbers. At least one sub-pixel Pxij may include a circuit unit and a light emitting device connected with the circuit unit, wherein the circuit unit may include a pixel drive circuit, and the pixel drive circuit may be connected with a scan signal line, a light emitting signal line, and a data signal line, respectively.

In an exemplary embodiment, the timing control circuit may provide a gray-scale value and a control signal suitable for the specification of the data drive circuit to the data drive circuit, provide a clock signal, a scan start signal, etc., suitable for the specification of the Gate GOA circuit to the Gate GOA, and provide a clock signal, a light emitting stop signal, etc., suitable for the specification of the EM GOA circuit to the EM GOA circuit. For example, the timing control circuit may be disposed in a drive IC.

In an exemplary embodiment, the data drive circuit may generate a data voltage to be provided to the data signal lines D1, D2, D3, . . . , and Dn using the gray-scale value and the control signal received from the timing control circuit. For example, the data drive circuit may sample the gray-scale value by using the clock signal and apply the data voltage corresponding to the gray-scale value to the data signal lines D1 to Dn, taking a sub-pixel line as a unit, where n may be a natural number.

In an exemplary embodiment, the Gate GOA circuit may generate a scan signal to be provided to the scan signal lines S1, S2, S3, . . . , and Sm by receiving the clock signal, the scan start signal, and etc., from the timing control circuit. For example, the Gate GOA circuit may sequentially provide a scan signal having a turn-on level pulse to the scan signal lines S1 to Sm. For example, the Gate GOA circuit may be constructed as a form of a shift register, and may generate a scan signal in a mode of sequentially transmitting a scan start signal provided in a form of a turn-on level pulse to a next-stage circuit under controlling of the clock signal, wherein m may be a natural number.

In an exemplary embodiment, the EM GOA circuit may generate an emitting signal to be provided to the light emitting signal lines E1, E2, E3, . . . , and Eo by receiving the clock signal, the light emitting stop signal, etc., from the timing control circuit. For example, the EM GOA circuit may sequentially provide an emitting signal having a cut-off level pulse to the light emitting signal lines E1 to Eo. For example, the EM GOA circuit may be constructed as a form of a shift register, and may generate an emitting signal in a mode of sequentially transmitting the light emitting stop signal provided in a form of a cut-off level pulse to a next-stage circuit under controlling of the clock signal, wherein o may be a natural number.

In an exemplary embodiment, the pixel drive circuit is configured to receive a data voltage transmitted by the data signal line under controlling of the scan signal line and the light emitting signal line, and output a corresponding current to the light emitting device. For example, the pixel drive circuit may be a circuit structure of 3T1C, 4T1C, 5T1C, 5T2C, 6T1C, 7T1C, or 8T1C, or the like. Here, the embodiments of the present disclosure are not limited to this.

In an exemplary embodiment, the light emitting device is configured to emit light of a corresponding brightness in response to a current outputted by a pixel drive circuit of a sub-pixel in which the light emitting device is located. For example, the light emitting device may be an organic electroluminescent diode (OLED) or Quantum-dot Light Emitting Diodes (QLED), etc. Here, the embodiments of the present disclosure are not limited to this.

In an exemplary embodiment, the scan signal line, the light emitting control signal line, and the reset control signal line RS (reset) may extend along a horizontal direction, and the data signal line may extend along a vertical direction.

In an exemplary embodiment, the display apparatus may include multiple pixel units P arranged in a matrix, wherein at least one of the multiple pixel units P may include: a first sub-pixel P1 that emits light of a first color, a second sub-pixel P2 that emits light of a second color, and a third sub-pixel P3 that emits light of a third color, and the three sub-pixels may each include a thin film transistor, a pixel electrode, and a common electrode. For example, the first sub-pixel P1 may be a red (R) sub-pixel emitting red light, the second sub-pixel P2 may be a green (G) sub-pixel emitting green light, and the third sub-pixel P3 may be a blue (B) sub-pixel emitting blue light. For example, the pixel unit may include four sub-pixels, and here, the embodiments of the present disclosure are not limited to this.

In an exemplary embodiment, multiple sub-pixels in the pixel unit may be arranged in a mode, such as standing side by side horizontally, standing side by side vertically, an X shape , a cross shape, a shape like a Chinese character "品", or the like. For example, taking the pixel unit including three sub-pixels as an example, the three sub-pixels may be arranged in a mode, such as standing side by side horizontally, standing side by side vertically, a shape like a Chinese character "品", or the like. For example, taking the pixel unit including four sub-pixels as an example, the four sub-pixels may be arranged in a mode, such as standing side by side horizontally, standing side by side vertically, or a square shape. Here, the embodiments of the present disclosure are not limited to this.

In an exemplary embodiment, a shape of a sub-pixel in the pixel unit may be any one or more of a triangle, a square, a rectangle, a rhombus, a trapezoid, a parallelogram, a pentagon, a hexagon, or another polygon. Here, the embodiments of the present disclosure are not limited to this In an exemplary embodiment, the display apparatus may include, but is not limited to, any product or component having a display function such as a mobile phone, a tablet computer, a television, a display, a notebook computer, a digital photo bezel, or a navigator. Here, the embodiments of the present disclosure are not limited to this.

The above descriptions of embodiments of the display apparatus are similar to the above descriptions of embodiments of the display panel, and the embodiments of the display apparatus have similar beneficial effects as the embodiments of the display panel. Technical details undisclosed in the embodiments of the display apparatus of the present disclosure may be understood by those skilled in the art with reference to the descriptions in the embodiments of the display panel of the present disclosure, which will not be repeated here.

Although the implementations of the present disclosure are disclosed above, the above contents are only implementations for easily understanding the present disclosure and not intended to limit the present disclosure. Any person skilled in the art to which the present disclosure pertains may make any modification and variation in implementation forms and details without departing from the spirit and scope disclosed in the present disclosure. However, the scope of patent protection of the present disclosure is still subject to the scope defined by the appended claims.

The invention claimed is:

1. A display panel, comprising: a display region and a non-display region that at least partially surrounds the display region; wherein, the display region comprises: M first display regions sequentially disposed along a first direction, a first display region comprises a plurality of first signal lines sequentially disposed along the first direction and extending along a second direction, the second direction intersects with the first direction;

the non-display region comprises M first gate driver on array (GOA) circuits and M clock signal line groups, a clock signal line group comprises a plurality of clock signal lines, and the at least two clock signal lines are respectively located in at least two clock signal line groups of the M clock signal line groups; a first gate driver on array circuit comprises a plurality of first gate driver on array units, a plurality of first gate driver on array units in an m-th first gate driver on array circuit are connected with at least one clock signal line of a plurality of clock signal lines of an m-th clock signal line group, and a plurality of first gate driver on array units in the m-th first gate driver on array circuit are connected with a plurality of first signal lines in an m-th first display region in one-to-one correspondence, wherein M is a positive integer greater than or equal to 2, and m is a positive integer less than or equal to M;

the M clock signal line groups respectively correspond to the M first display regions and the M first GOA circuits;

the M clock signal line groups comprise a first clock signal line group, a second clock signal line group, and a third clock signal line group, and the first clock signal line group comprises a first clock signal line and a second clock signal line, and the second clock signal line group comprises a third clock signal line and a fourth clock signal line, and the third clock signal line group comprises a fifth clock signal line and a sixth clock signal line;

the non-display region comprises a first first GOA circuit GOA circuit, a second first GOA circuit GOA circuit, a third first GOA circuit GOA circuit;

clock signal lines connected with first first GOA circuit are only the first clock signal line and the second clock signal line;

clock signal lines connected with second first GOA circuit are only the third clock signal line and the fourth clock signal line;

clock signal lines connected with third first GOA circuit are only the fifth clock signal line and the sixth clock signal line.

2. The display panel of claim 1, wherein, the non-display region comprises: a bonding region located at a side of the display region in the first direction, and a bezel region located at another side of the display region, wherein the bonding region comprises an integrated circuit, configured to output a clock signal to the M clock signal line groups, and the M first gate driver on array circuits and the M clock signal line groups are located in the bezel region.

3. The display panel of claim 1, wherein the display region further comprises: a second display region located between two adjacent first display regions, wherein the second display region comprises a plurality of second signal lines alternately disposed along the first direction and extending along the second direction;

the non-display region further comprises: a second gate driver on array circuit corresponding to the second display region, wherein the second gate driver on array circuit comprises a plurality of second gate driver on array units; and an odd quantity of second gate driver on array units are connected with at least one clock signal line of a plurality of clock signal lines of a clock signal line group connected with one first display region of the adjacent two first display regions, an even quantity of second gate driver on array units are connected with at least one clock signal line of a plurality of clock signal lines of a clock signal line group connected with the other first display region of the adjacent two first display regions, and a plurality of second gate driver on array units are connected with a plurality of second signal lines in one-to-one correspondence.

4. The display panel of claim 3, wherein a quantity of the second display regions is M−1, and an n-th second display region is disposed between an n-th first display region and an (n+1)-th first display region, wherein n is a positive integer less than or equal to M−1.

5. The display panel of claim 3, wherein a quantity of the second gate driver on array units is less than a quantity the first gate driver on array units.

6. The display panel of claim 3, wherein in each second gate driver on array circuit, a quantity of the second gate driver on array units is an even number greater than or equal to 4.

7. The display panel of claim 3, wherein a first gate driver on array unit and a second gate driver on array unit each comprise: any one of a gate GOA (gate driver on array) unit, and an emitting GOA unit.

8. The display panel of claim 3, wherein a first signal line and a second signal line each comprise: any one of a scan signal line, and a light emitting control signal line.

9. The display panel of claim 1, wherein the non-display region comprises: three clock signal line groups, or four clock signal line groups.

10. The display panel of claim 1, wherein each clock signal line group comprises: two clock signal lines or four clock signal lines.

11. The display panel of claim 1, wherein quantities of first signal lines in the M first display regions are the same, or quantities of first signal lines in at least two first display regions of the M first display regions are different.

12. The display panel of claim 1, wherein the M clock signal line groups are disposed at a side of the M first gate driver on array circuits away from the display region.

13. A display apparatus, comprising: the display panel of claim 1.

14. The display panel of claim 2, wherein the display region further comprises: a second display region located between two adjacent first display regions, wherein the second display region comprises a plurality of second signal lines alternately disposed along the first direction and extending along the second direction;

the non-display region further comprises: a second gate driver on array circuit corresponding to the second display region, wherein the second gate driver on array circuit comprises a plurality of second gate driver on array units; and an odd quantity of second gate driver on array units are connected with at least one clock signal line of a plurality of clock signal lines of a clock signal line group connected with one first display region of the adjacent two first display regions, an even quantity of second gate driver on array units are connected with at least one clock signal line of a plurality of clock signal lines of a clock signal line group connected with the other first display region of the adjacent two first display regions, and a plurality of second gate driver on array units are connected with a plurality of second signal lines in one-to-one correspondence.

15. The display panel of claim 2, wherein the non-display region comprises: three clock signal line groups, or four clock signal line groups.

* * * * *